(12) United States Patent
Kato et al.

(10) Patent No.: US 10,788,001 B2
(45) Date of Patent: Sep. 29, 2020

(54) STRUCTURE OF MOUNTING INTAKE AIR TEMPERATURE SENSOR OF ENGINE WITH SUPERCHARGER

(71) Applicant: Mazda Motor Corporation, Aki-gun, Hiroshima (JP)

(72) Inventors: Jiro Kato, Hiroshima (JP); Mitsunori Wasada, Hiroshima (JP); Hidesaku Ebesu, Hiroshima (JP); Toshihiko Hirata, Hiroshima (JP); Tatsuya Koga, Higashihiroshima (JP); Shuhei Tsujita, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 129 days.

(21) Appl. No.: 15/985,928

(22) Filed: May 22, 2018

(65) Prior Publication Data
US 2018/0340496 A1    Nov. 29, 2018

(30) Foreign Application Priority Data

May 29, 2017 (JP) ................................. 2017-105806

(51) Int. Cl.
*F02M 35/10* (2006.01)
*F02B 29/04* (2006.01)

(52) U.S. Cl.
CPC ..... *F02M 35/1038* (2013.01); *F02B 29/0406* (2013.01); *F02M 35/10111* (2013.01); *F02M 35/10157* (2013.01)

(58) Field of Classification Search
CPC ......... F02M 35/1038; F02M 35/10111; F02M 35/10157; F02M 35/10118; F02M 35/10091; F02B 29/0406

USPC ............................................... 123/559.1–565
See application file for complete search history.

(56) References Cited

U.S. PATENT DOCUMENTS

| | | | | |
|---|---|---|---|---|
| 5,261,272 | A * | 11/1993 | Rush, II | ........... F02M 35/10039 73/114.34 |
| 8,439,020 | B1 * | 5/2013 | Carlson | ................... F02B 33/40 123/559.1 |
| 2012/0018127 | A1 | 1/2012 | Iwasaki | |
| 2018/0209385 | A1 * | 7/2018 | Berner | ............... F02M 35/1038 |

FOREIGN PATENT DOCUMENTS

| | | |
|---|---|---|
| JP | 2010223038 A | 10/2010 |
| JP | 2011237189 A | 11/2011 |
| JP | 2016114043 A | 6/2016 |
| JP | 2016121542 A | 7/2016 |

* cited by examiner

*Primary Examiner* — Laert Dounis
*Assistant Examiner* — Edward Bushard
(74) *Attorney, Agent, or Firm* — Alleman Hall Creasman & Tuttle LLP

(57) ABSTRACT

The present disclosure aims to stabilize, in an engine with a supercharger, a detection result of an intake air temperature sensor interposed between the supercharger and an intercooler. A gas outlet of a supercharger and a gas inlet of an intercooler are connected together via a second passage. The second passage includes, in its middle position, a narrow region with a smaller cross-sectional area than the part of the second passage extending from an upstream end of the second passage to the middle position. The narrow region is provided with the intake air temperature sensor configured to detect the gas temperature in the narrow region.

10 Claims, 22 Drawing Sheets

STRUCTURE OF MOUNTING INTAKE AIR TEMPERATURE SENSOR OF ENGINE WITH SUPERCHARGER

CROSS-REFERENCE TO RELATED APPLICATION

This application claims priority to Japanese Patent Application No. 2017-105806 filed on May 29, 2017, the entire disclosure of which is hereby incorporated by reference.

TECHNICAL FIELD

The present disclosure relates to a structure of mounting an intake air temperature sensor of an engine with a supercharger.

BACKGROUND

Japanese Unexamined Patent Publication No. 2010-223038 discloses an exemplary engine with a supercharger. Specifically, this engine includes an engine body (engine), and an intake path (intake air control system). Intake air is supplied to the engine body. The intake path includes a supercharger and an intercooler (high temperature heat exchanger) between upstream and downstream ends of the intake path in this order from the upstream end along which gas flows, and communicates with cylinders of the engine body at a downstream end of the intake path. This intake path includes an intermediate passage (a passage composed of, for example, a case), which connects a gas outlet of the supercharger and a gas inlet of the intercooler together.

Japanese Unexamined Patent Publication No. 2010-223038 also discloses attaching an intake air temperature sensor (sensor) to the intermediate passage described above. That is, this intake air temperature sensor according to Japanese Unexamined Patent Publication No. 2010-223038 is located between the supercharger and the intercooler.

In order to obtain reliability of the supercharger, the temperature of the discharged gas needs to be monitored as appropriate, and set to be lower than or equal to a predetermined upper limit. Detection of the gas temperature around the inlet is required to measure the amount of heat dissipation of the intercooler.

In order to satisfy these demands, the following measure is conceivable as an example. As described in the above Patent Document 1, the intake air temperature sensor may be provided in the intermediate passage, which connects the supercharger and the intercooler together, to detect the temperature of the gas which has been discharged from the supercharger and not yet introduced to the intercooler.

SUMMARY

However, in this configuration, pulsation in the discharge pressure of the supercharger or jet of the gas discharged from the supercharger may cause non-uniform distribution of the gas temperature in the intermediate passage, which provides unstable detection results. Such non-uniform distribution may occur in the temperature of the gas which has not yet discharged to the intermediate passage, when being compressed inside the supercharger.

To address this problem, providing a screw in a middle of the intermediate passage to stir the gas is conceivable. It is, however, not preferred in view of fuel efficiency, if the energy needed for the action is taken into account. Providing, for example, a fin in the intermediate passage is also conceivable. However, this increases intake resistance, and is thus disadvantageous.

The present disclosure was made in view of these problems. The present disclosure aims to stabilize, in an engine with a supercharger, detection results of an intake air temperature sensor interposed between the supercharger and an intercooler.

The present disclosure is directed to a structure of mounting an intake air temperature sensor of an engine with a supercharger. The structure includes an engine body including cylinders, and an intake path including, between its upstream and downstream ends, the supercharger and an intercooler in this order from the upstream end, and communicating with the cylinders of the engine body at the downstream end.

In this structure, the intake path includes an intermediate passage connecting a gas outlet of the supercharger and a gas inlet of the intercooler together. The intermediate passage includes, in its middle position, a narrow region with a smaller cross-sectional area than a part of the intermediate passage extending from an upstream end of the intermediate passage to the middle position.

The narrow region is provided with the intake air temperature sensor configured to detect a gas temperature in the narrow region.

Pulsation in the discharge pressure and/or jet of the gas discharged from the supercharger may cause non-uniform temperature distribution of the gas immediately after being discharged from the supercharger. Specifically, relatively high temperature gas flow and lower temperature gas flow may coexist around the upstream end of the intermediate passage. Such a state is disadvantageous in stably detecting the gas temperature.

However, according to the configuration described above, the intermediate passage has a smaller cross-sectional area in the position including the narrow region than in the part located upstream of this position. With this configuration, the high-temperature gas flow and the low-temperature gas flow are gathered together when passing through the narrow region.

This reduces non-uniform temperature distribution in the narrow region as compared to the region around the upstream end of the intermediate passage. Placement of the intake air temperature sensor in such a narrow region stabilizes the detection result.

In addition, the configuration described above is obtained by changing the shape of the intermediate passage itself and mounting the intake air temperature sensor in a suitable position, without adding any screw, fin, or other component. The configuration described above is thus more advantageous in obtaining fuel efficiency than in the configuration including a screw, for example, in a middle of the intermediate passage. The configuration described above maintains the simple overall shape of the intermediate passage, and eventually reduces an increase in the intake resistance as compared to the configuration including, for example, a fin in the intermediate passage.

Further, the gas outlet and the gas inlet may be open in a same direction. The intermediate passage may extend from its upstream end connected to the gas outlet, in the direction in which the gas outlet and the gas inlet are open, and is then bent toward the gas inlet. The narrow region is located downstream of a position in which the intermediate passage is bent toward the gas inlet.

This configuration allows the gas, which flowed from the supercharger into the intermediate passage, to flow forward from the upstream end of the intermediate passage, and then to collide with the wall surface of the intermediate passage around the bent position so as to be oriented toward the gas inlet. The oriented gas flows along the collided inner wall surface in accordance with a so-called "wall-guide effect." This collects the high-temperature gas flow and the low-temperature gas flow around the wall surface, which reduces non-uniform temperature distribution.

In addition, the gas flow along the wall surface of the intermediate passage may cause turbulence around the wall surface. This turbulence stirs the gas flowing around the wall surface, which is advantageous in reducing non-uniform temperature distribution.

In this manner, the influence of the collision with the wall surface, as well as the influence of the narrow region described above make the configuration more advantageous in reducing variations in the gas temperature. This leads to stabilization of the detection result of the intake air temperature sensor.

Further, the intermediate passage may be a thin passage with a smaller depth in the direction in which the gas outlet and the gas inlet are open, than a width orthogonal to a direction extending from the gas outlet to the gas inlet. The narrow region may have a smaller width than a part of the intermediate passage extending from the upstream end of the intermediate passage to the narrow region, and a part of the intermediate passage extending from the narrow region to a downstream end of the intermediate passage.

This configuration reduces the depth of the intermediate passage and eventually the depth of the entire engine.

In addition, the narrow region is formed by reducing not the depth, but the width of the intermediate passage, which is relatively longer than the depth. This reduces an increase in the intake resistance as compared to the configuration with a smaller depth.

Further, the narrow region may form a recess in an outer surface of the intermediate passage. The intake air temperature sensor may include a detector located at its distal end, and inserted inside the intermediate passage, and a fixed portion located at its base end opposite to the detector, and exposed to an outside of the intermediate passage. The fixed portion may be fixed inside the recess.

When an intake air temperature sensor is mounted in the intake path, the detector at the distal end of the intake air temperature sensor is typically inserted inside a passage, while a fixed portion at the base end is typically exposed to the outside of the passage. In this case, the fixed portion is fixed to the duct defining the intake path by means of, for example, engagement.

This configuration utilizes the recess in the outer surface of the intermediate passage in placement of the fixed portion of the intake air temperature sensor. Then, the intake air temperature sensor can be mounted in a smaller area, without increasing the whole size of the engine.

Further, the supercharger and the intercooler may be adjacent to each other at a predetermined distance. The intake air temperature sensor may include a detector located at its distal end, and inserted inside the intermediate passage, and a fixed portion located at its base end opposite to the detector, and exposed to an outside of the intermediate passage. The fixed portion may be located in a gap between the supercharger and the intercooler.

This configuration utilizes the gap between the supercharger and the intercooler in placement of the fixed portion of the intake air temperature sensor. Then, the intake air temperature sensor can be mounted in a smaller area, without increasing the whole size of the engine.

Further, the cylinders may be arranged in a line. A central portion of the gas outlet may be offset from a central portion of the upstream end of the intermediate passage to one side of a cylinder bank, as the gas outlet is viewed from front in a direction orthogonal to the cylinder bank. The intake air temperature sensor may be offset from a central portion of the narrow region in a direction along the cylinder bank to the one side of the cylinder bank.

The gas outlet of the supercharger may be offset from the intermediate passage due to, for example, the design specifications of the supercharger. In this case, the temperature distribution of the gas flowing through the outlet into the intermediate passage is also biased in the direction in which the gas outlet is offset.

In the configuration described above, the intake air temperature sensor is also offset in the direction in which the discharge port is offset. This enables more precise detection of the gas temperature.

As described above, the above-described structure of mounting the intake air temperature sensor of the engine with the supercharger stabilizes detection results of the intake air temperature sensor interposed between the supercharger and the intercooler.

DETAILED DESCRIPTION

Figure 1:
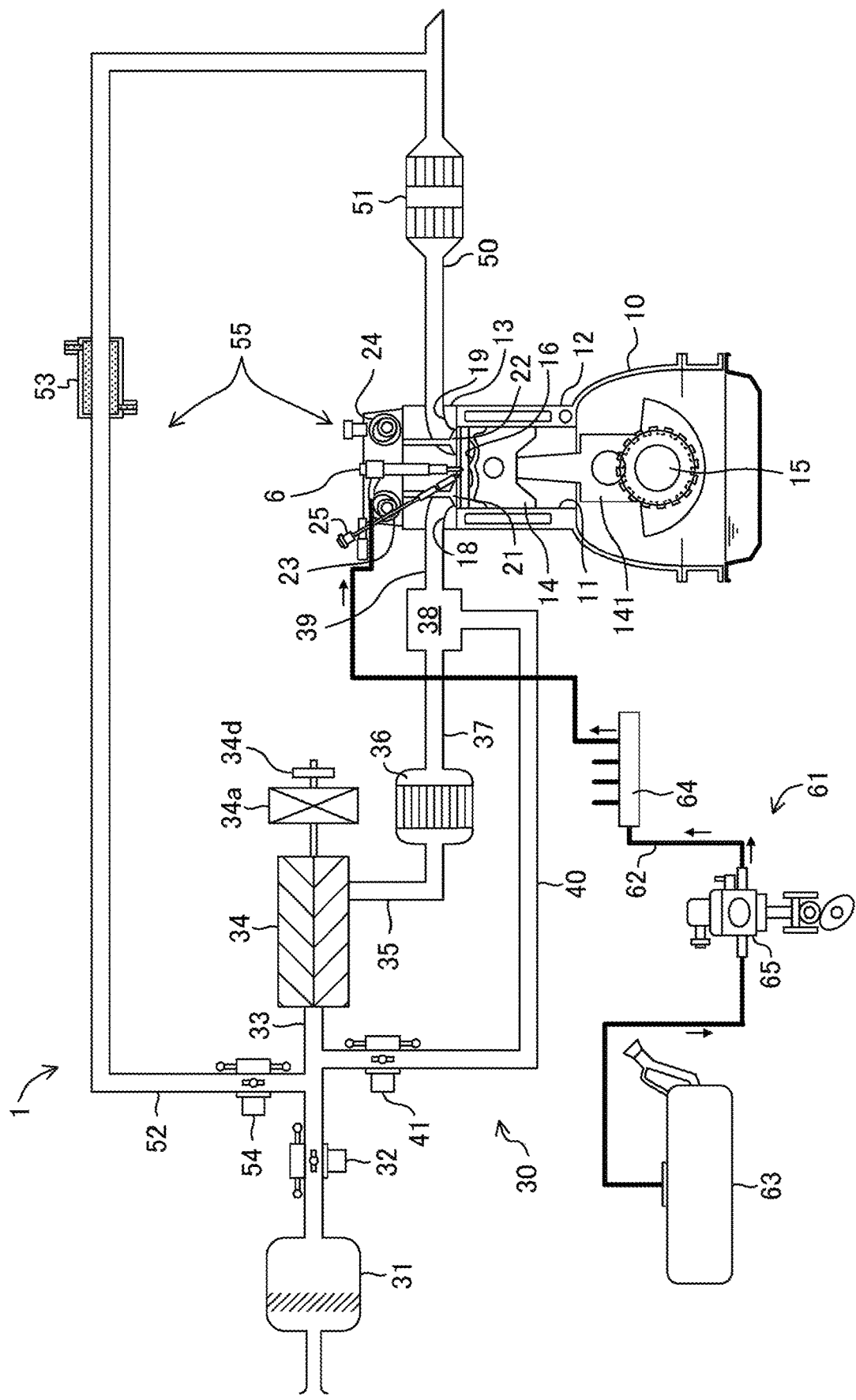
FIG. 1 schematically illustrates a configuration of a multi-cylinder engine.
Figure 2:
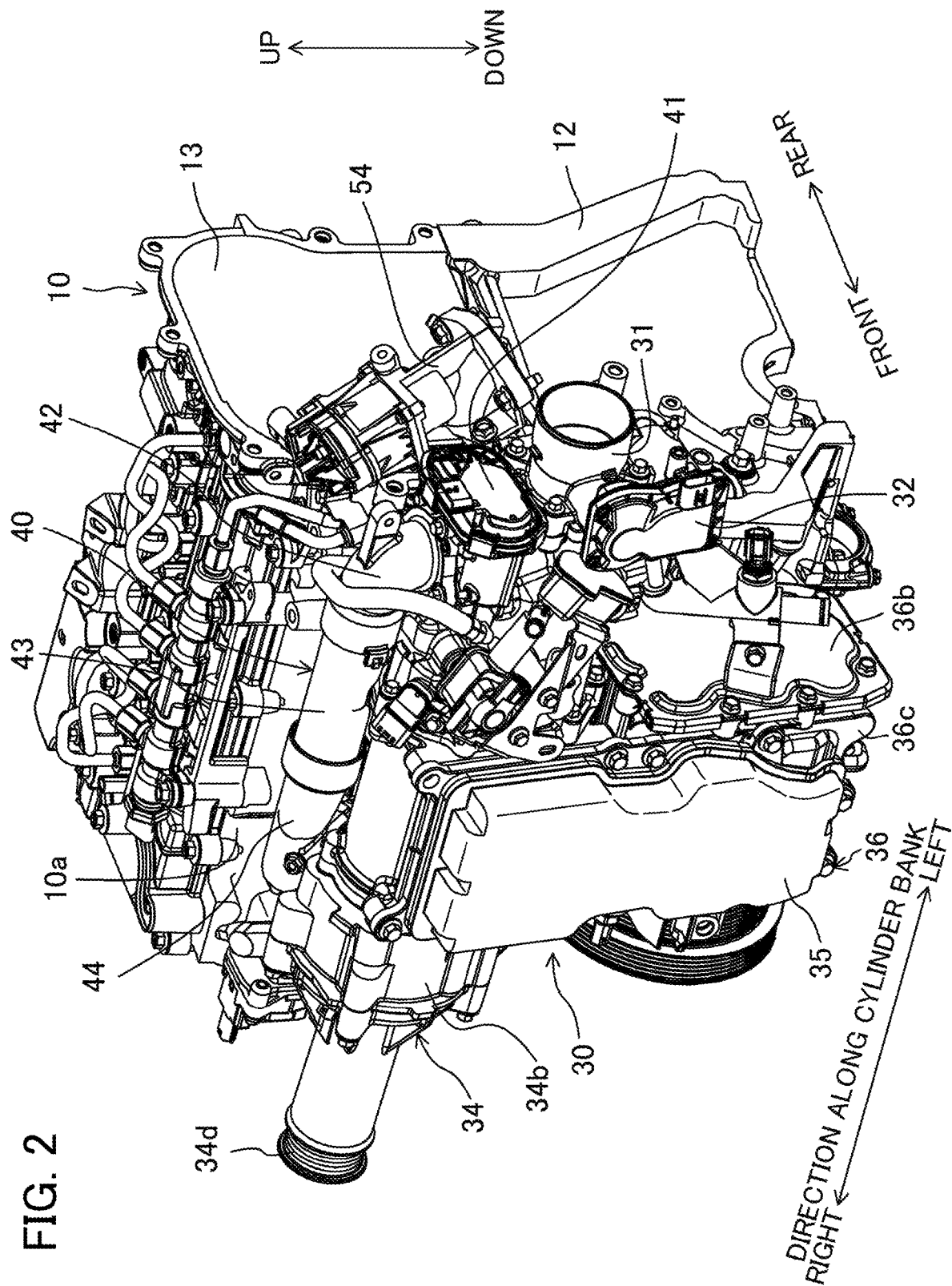
FIG. 2 is a perspective view of the configuration of the multi-cylinder engine, a part of which is not shown.
Figure 3:
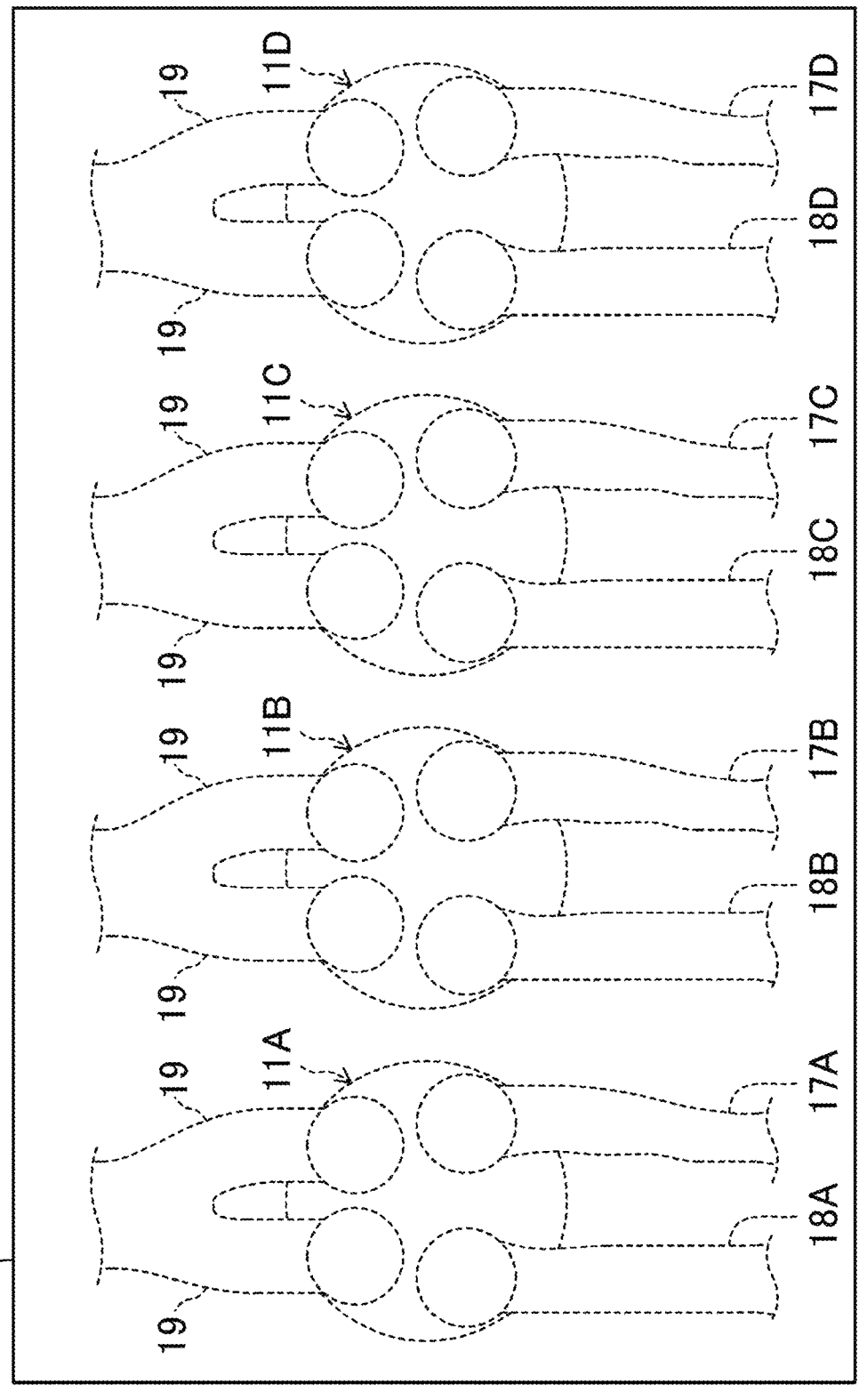
FIG. 3 is a top view schematically illustrating a configuration around four cylinders.

Now, an embodiment of a structure of mounting an intake air temperature sensor of an engine with a supercharger will be described with reference to the drawings. The following description is illustrative only. FIG. 1 is a schematic view of an exemplary multi-cylinder engine (hereinafter simply referred to as an "engine") 1, to which a "structure of mounting an intake air temperature sensor engine with a supercharger" according to the present disclosure is applied. FIG. 2 is a perspective view of the configuration of the engine 1, a part of which is not shown. FIG. 3 is a top view schematically illustrating a configuration around four cylinders 11.

The engine 1 is a gasoline engine (particularly, a four-stroke internal combustion engine) mounted in an FF vehicle, and includes a mechanically driven supercharger 34 as shown in FIG. 1.

The engine 1 according to this embodiment is a so-called in-line four-cylinder transverse engine including four cylinders 11 arranged in line in the vehicle width direction as shown in FIG. 3. In this embodiment, the engine longitudinal direction, along which the four cylinders 11 are arranged (along a cylinder bank), substantially agrees with the vehicle width direction, while the engine width direction substantially agrees with the vehicle longitudinal direction.

Unless particularly described, the "front" means one end of an element in the engine width direction (the front in the vehicle longitudinal direction), while the "rear" means the other end of the element in the engine width direction (the rear in the vehicle longitudinal direction). The "left" of an element means one end of an element in the engine longitudinal direction (along the cylinder bank; the left of the element in the vehicle width direction, and closer to the front of the engine), while the "right" of the element means the other end of the element in the engine longitudinal direction (along the cylinder bank; the right of the element in the vehicle width direction, and closer to the rear of the engine).

In the following description, the "upper" side of an element means the upper side of the element in the vehicle height direction, with the engine 1 mounted in the vehicle (hereinafter also referred to as an "in-vehicle mounted state), the "lower" side of the element means the lower side of the element in the vehicle height direction in the in-vehicle mounted state.

Rough Configuration of Engine

The engine 1 is of a front intake, rear exhaust type. That is, the engine 1 includes an engine body 10, an intake path 30, and an exhaust path 50, as shown in FIG. 1. The engine body 10 includes the four cylinders 11 (only one cylinder is shown in FIG. 1). The intake path 30 is located in front of the engine body 10, and communicates with the cylinders 11 via intake ports 17 and 18. The exhaust path 50 is located behind the engine body 10, and communicates with the cylinders 11 via exhaust ports 19 and 19.

The intake path 30 according to this embodiment includes passages, which guide gas, apparatuses such as the supercharger 34 and an intercooler 36, and a bypass passage 40 bypassing these apparatuses, which are combined as a unit to be an intake apparatus.

The engine body 10 burns a mixture of fuel and the gas supplied from the intake path 30 in the cylinders 11 in a predetermined combustion order. Specifically, the engine body 10 includes a cylinder block 12, and a cylinder head 13 placed above the cylinder block 12.

The four cylinders 11 are provided inside the cylinder block 12. The four cylinders 11 are arranged in a line along the central axis of a crankshaft 15 (along the cylinder bank). Each of the four cylinders 11 is formed like a tube. The central axes of the cylinders 11 (hereinafter referred to as cylinder axes) extend in parallel to each other, and perpendicularly to the length of the cylinder bank. The four cylinders 11 shown in FIG. 3 may be hereinafter referred to as a first cylinder 11A, a second cylinder 11B, a third cylinder 11C, and a fourth cylinder 11D in this order from the right along the cylinder bank.

A piston 14 is slidably fitted into each of the cylinders 11. The piston 14 is coupled to the crankshaft 15 through a connecting rod 141. The piston 14 defines a combustion chamber 16 together with the cylinder 11 and the cylinder head 13.

The ceiling of the combustion chamber 16 is like a so-called pent roof, and formed of the lower surface of the cylinder head 13. In this engine 1, the combustion chamber 16 has a lower ceiling than a typical combustion chamber to increase a geometric compression ratio. The pent-roof shape of the ceiling is almost flat.

The two intake ports 17 and 18 are provided for the cylinder head 13 of each cylinder 11. The two intake ports 17 and 18 communicate with the combustion chamber 16. Each cylinder 11 includes a first port 17, and a second port 18 adjacent to the first port 17 along the cylinder bank. The first and second ports 17 and 18 are arranged in the same order in the first to fourth cylinders 11A to 11D. Specifically, as shown in FIG. 3, the second port 18 and the first port 17 are arranged in this order from the right along the cylinder bank in each of the cylinders 11.

The upstream ends of the intake ports 17 and 18 are open to an outer surface (mounting surface 10a) of the engine body 10, and connected to the downstream end of the intake path 30. On the other hand, the downstream ends of the ports 17 and 18 are open to the ceiling of the combustion chamber 16.

Hereinafter, reference character 17A may be added to the first port communicating with the first cylinder 11A instead of reference numeral 17, while reference character 18A may be added to the second port communicating with the cylinder 11A instead of reference numeral 18. This is also applicable to the second to fourth cylinders 11B to 11D. For example, reference character 18C may be added to the second port communicating with the third cylinder 11C instead of reference numeral 18.

In each cylinder 11, the two intake ports 17 and 18 include a swirl control valve (SCV) port including an SCV 80, which limits the flow rate of the passing gas. In this embodiment, the second port 18 described above serves as the SCV port.

Each of the two intake ports 17 and 18 is provided with an intake valve 21. The intake valve 21 opens and closes the path between the combustion chamber 16 and the intake port 17 or 18. The intake valve 21 is opened and closed at predetermined timing by an intake valve train.

In this exemplary configuration, the intake valve train includes an electric intake variable valve timing mechanism (VVT) 23 as shown in FIG. 1. The intake VVT 23 continuously changes the rotational phase of an intake camshaft within a predetermined angle range. Accordingly, the opening and closing times of the intake valve 21 change continuously. The intake valve train may include a hydraulic VVT in place of the electric VVT.

The two exhaust ports 19 and 19 are provided for the cylinder head 13 of each cylinder 11. The two exhaust ports 19 and 19 communicate with the combustion chamber 16.

Each of the two exhaust ports 19 and 19 is provided with an exhaust valve 22. The exhaust valve 22 opens and closes the path between the combustion chamber 16 and one of the exhaust ports 19 and 19. The exhaust valve 22 is opened and closed at predetermined timing by an exhaust valve train.

In this exemplary configuration, the exhaust valve train includes an electric exhaust variable valve timing mechanism (VVT) 24, as shown in FIG. 1. The exhaust VVT 24 continuously changes the rotational phase of an exhaust camshaft within a predetermined angle range. Accordingly, the opening and closing times of the exhaust valve 22 change continuously. The exhaust valve train may include a hydraulic VVT in place of the electric VVT.

Although not described in detail, in this engine 1, the electric intake and exhaust VVTs 23 and 24 adjust the length of the overlap period between the opening time of the intake valve 21 and the closing time of the exhaust valve 22. This allows scavenging of residual gas within the combustion chamber 16, and confinement of hot burnt gas in the combustion chamber 16 (i.e., introduction of internal exhaust gas recirculation (EGR) gas) into the combustion chamber 16. In this exemplary configuration, the electric intake and exhaust VVTs 23 and 24 form an internal EGR system. The internal EGR system is not necessarily formed of VVTs.

An injector 6 is attached to the cylinder head 13 of each cylinder 11. In this exemplary configuration, the injector 6 is a multi-nozzle fuel injection valve, which directly injects fuel into the combustion chamber 16.

The injector 6 is connected to a fuel supply system 61. The fuel supply system 61 includes a fuel tank 63 configured to store fuel, and a fuel supply passage 62 connecting the fuel tank 63 and the injector 6 together. The fuel supply passage 62 is interposed between a fuel pump 65 and a common rail 64. The fuel pump 65 pumps out fuel to the common rail 64. In this exemplary configuration, the fuel pump 65 is a plunger pump driven by the crankshaft 15. The common rail 64 stores the fuel pumped out of the fuel pump 65 at a high fuel pressure. When the injector 6 opens, the fuel stored in the common rail 64 is injected through the nozzle of the injector 6 into the combustion chamber 16.

A spark plug 25 is attached to the cylinder head 13 of each cylinder 11. The tip of the spark plug 25 faces the inside of the combustion chamber 16 to forcibly inject the mixture inside the combustion chamber 16.

As shown in FIG. 2, the intake path 30 is connected to the front side surface (mounting surface 10a) of the engine body 10, and communicates with the intake ports 17 and 18 of the cylinders 11. The gas to be introduced into the combustion chamber 16 flows through the intake path 30. An air cleaner 31 filtering fresh air is provided at the upstream end of the intake path 30. A surge tank 38 is provided near the downstream end of the intake path 30. As shown in FIG. 1, the part of the intake path 30 which is downstream of the surge tank 38, branches off into independent passages 39. Each cylinder 11 is provided with two of the independent passages 39.

Although will be described in detail, one of the two independent passages 39 is connected to the first port 17, while the other is connected to the second port 18. Hereinafter, reference numeral 391 may be added to the former independent passage 39, while reference numeral 392 may be added to the latter. The downstream end of each independent passage 39 is connected to the intake port 17 or 18.

A throttle valve 32 is provided in the intake path 30 between the air cleaner 31 and the surge tank 38. The opening degree of the throttle valve 32 is adjusted to regulate the amount of fresh air to be introduced into the combustion chamber 16.

The supercharger 34 is provided in the intake path 30 downstream of the throttle valve 32. The supercharger 34 supercharges the gas to be introduced into the combustion chamber 16. In this exemplary configuration, the supercharger 34 is mechanically driven by the engine 1. The supercharger 34 according to this embodiment may be a Roots supercharger with any configuration. The supercharger may be for example, of a Lysholm type or a centrifugal type.

An electromagnetic clutch 34a is interposed between the supercharger 34 and the engine 1. The electromagnetic clutch 34a transmits and shuts off drive power between the supercharger 34 and the engine 1. A control means (not shown) such as an engine control unit (ECU) switches engagement and disengagement of the electromagnetic clutch 34a to turn on and off the supercharger 34. That is, the operation of this engine 1 is switched between a mode of supercharging the gas to be introduced into the combustion chamber 16 and a mode of not supercharging the gas to be introduced into the combustion chamber 16 by turning on and off the supercharger 34.

The intercooler 36 is provided in the intake path 30 downstream of the supercharger 34. The intercooler 36 cools the gas compressed by the supercharger 34. The intercooler 36 of this exemplary configuration is of a water-cooling type.

The intake path 30 includes a first passage 33, a second passage 35, and a third passage 37 as passages connecting the devices included in the intake path 30. The first passage 33 is provided downstream of the air cleaner 31 and guides the intake air cleaned by the air cleaner 31 to the supercharger 34. The second passage 35 guides the intake air compressed by the supercharger 34 to the intercooler 36. The third passage 37 guides the gas cooled by the intercooler 36 to the surge tank 38. In order to reduce the lengths of the paths (runner) from the surge tank 38 to the intake ports 17 and 18, the surge tank 38 is provided near the inlets (upstream ends) of the intake ports 17 and 18. The second and third passages 35 and 37 form a "supercharging path" together with the supercharger 34 and the intercooler 36.

The intake path 30 is provided with the bypass passage 40 bypassing the supercharger 34 and the intercooler 36. The bypass passage 40 connects the part of the intake path 30 extending from the downstream region of the throttle valve 32 to the upstream region of the supercharger 34, and the surge tank 38 together. The bypass passage 40 is provided with a bypass valve 41, which regulates the flow rate of the gas flowing through the bypass passage 40.

When the supercharger 34 is turned off (i.e., when the electromagnetic clutch 34a is disengaged), the bypass valve 41 fully opens. This allows the gas flowing through the intake path 30 to bypass the supercharger 34 and to flow into the surge tank 38, and introduces the gas via the independent passages 39 into the combustion chamber 16. The engine 1 is operated without supercharging, that is, by natural aspiration.

When the supercharger 34 is turned on (i.e., when the electromagnetic clutch 34a is engaged), the opening degree of the bypass valve 41 is adjusted as appropriate. This allows a portion of the gas which has passed through the supercharger 34 in the intake path 30, to flow through the bypass passage 40 back to the upstream side of the supercharger 34. Adjustment of the opening degree of the bypass valve 41 regulates the reflux flow rate, which leads to regulation of the supercharging pressure of the gas to be introduced into the combustion chamber 16. In this exemplary configuration, the supercharger 34, the bypass passage 40, and the bypass valve 41 form a supercharging system.

The exhaust path 50 is connected to the rear side surface of the engine body 10, and communicates with the exhaust ports 19 of the cylinders 11. The exhaust gas discharged from the combustion chamber 16 flows through the exhaust path 50. Although not shown in detail, the upstream part of the exhaust path 50 forms independent passages, each branches off for one of the cylinders 11. The upstream end of each independent passage is connected to the exhaust port 19 of one of the cylinders 11. The exhaust path 50 is provided with an exhaust gas purification system including one or more catalyst converter(s) 51. The catalyst converter(s) 51 include(s) a three-way catalyst. The exhaust gas purification system may contain substances other than the three-way catalyst.

An EGR passage 52 forming an external EGR system is connected between the intake path 30 and the exhaust path 50. The EGR passage 52 returns part of the burnt gas to the intake path 30. The upstream end of the EGR passage 52 is connected to a portion of the exhaust path 50 downstream of the catalyst converter 51. The downstream end of the EGR passage 52 is connected to a portion of the intake path 30 upstream of the supercharger 34, and upstream of the upstream end of the bypass passage 40.

The EGR passage 52 is provided with a water-cooled EGR cooler. The EGR cooler 53 cools the burnt gas. The EGR passage 52 is also provided with the EGR valve 54. The EGR valve 54 regulates the flow rate of the burnt gas flowing through the EGR passage 52. Adjustment of the opening degree of the EGR valve 54 regulates the flux flow rate of the cooled burnt gas, that is, external EGR gas.

In this exemplary configuration, an EGR system 55 is composed of an external EGR system including the EGR passage 52 and the EGR valve 54, and an internal EGR system including the electric intake and exhaust VVTs 23 and 24 described above.

Configuration of Intake Path

A configuration of the intake path 30 will now be described in detail.

Figure 4:
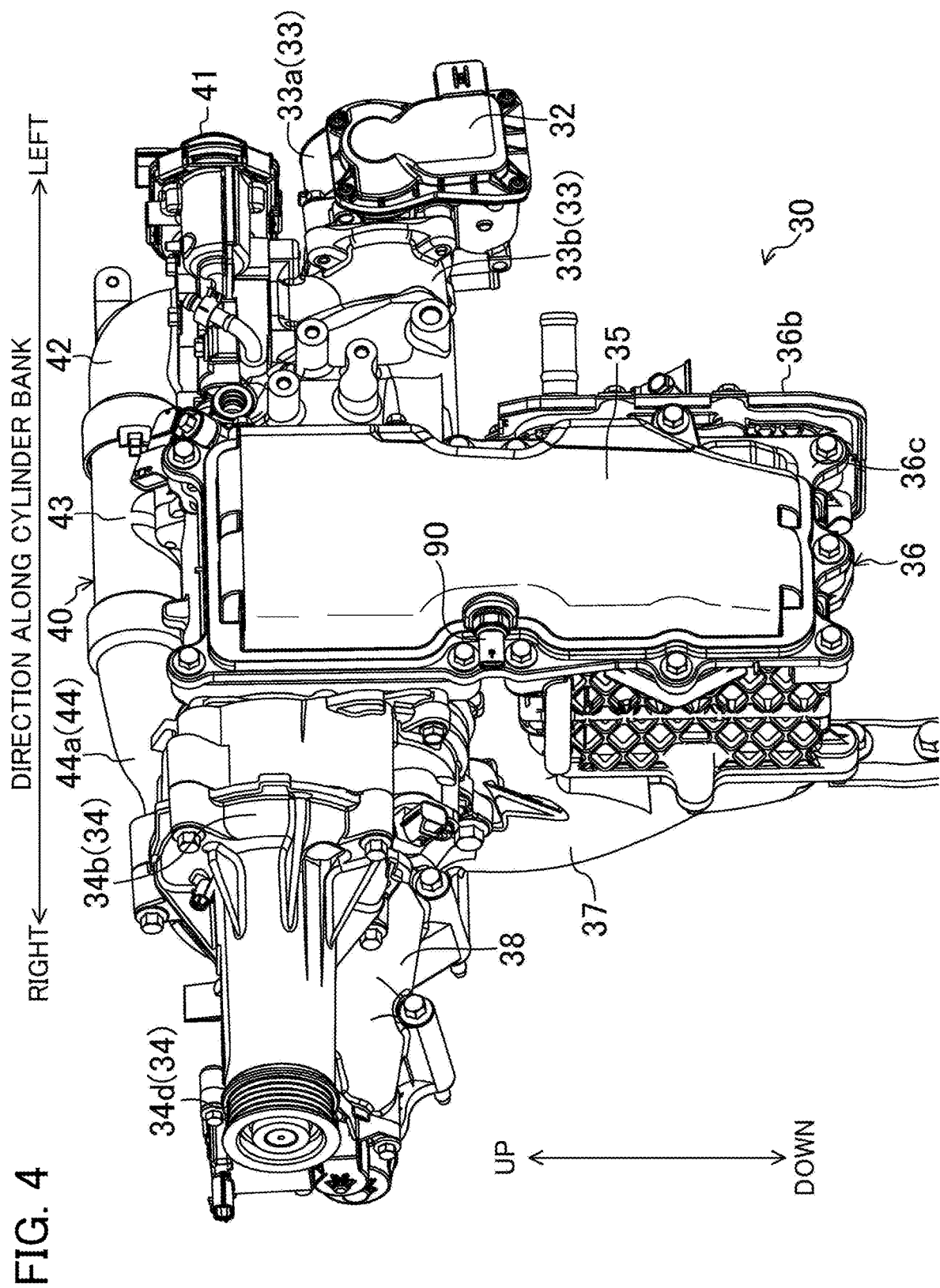
FIG. 4 illustrates an entire configuration of an intake apparatus as viewed from the front.
Figure 5:
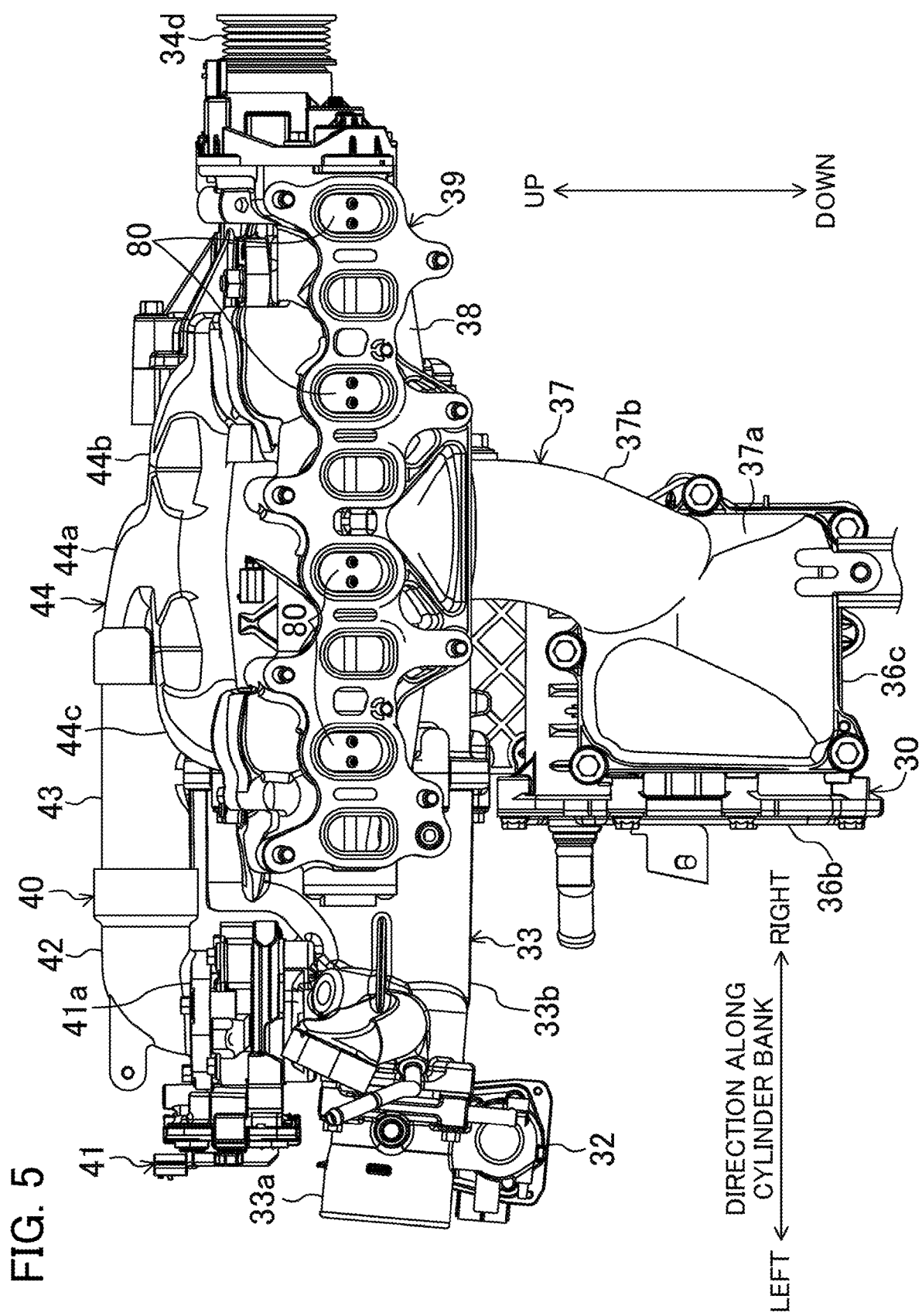
FIG. 5 illustrates the entire configuration of the intake apparatus as viewed from the rear.
Figure 6:
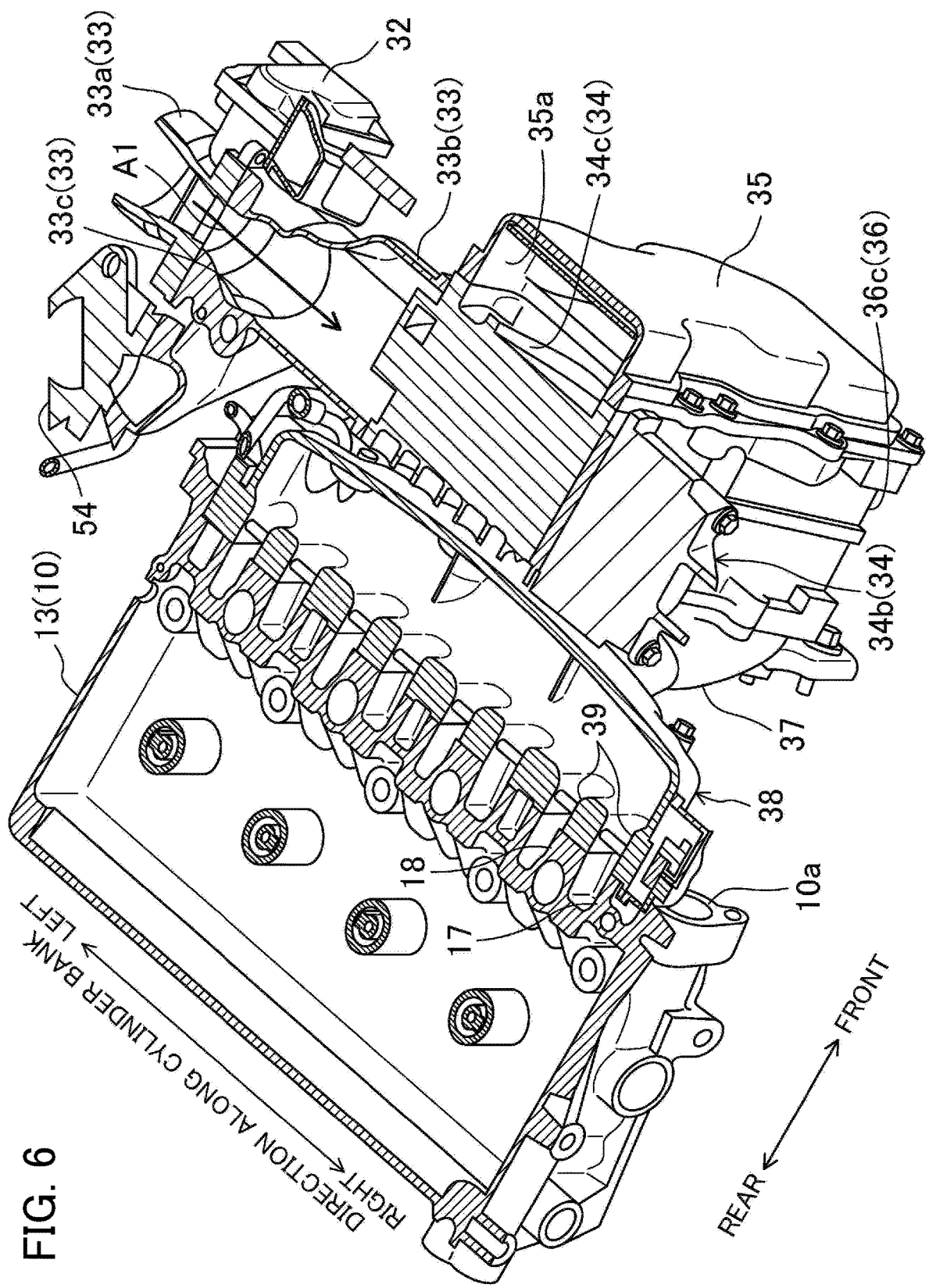
FIG. 6 is a transverse sectional view illustrating a passage configuration associated with a supercharger.
Figure 7:
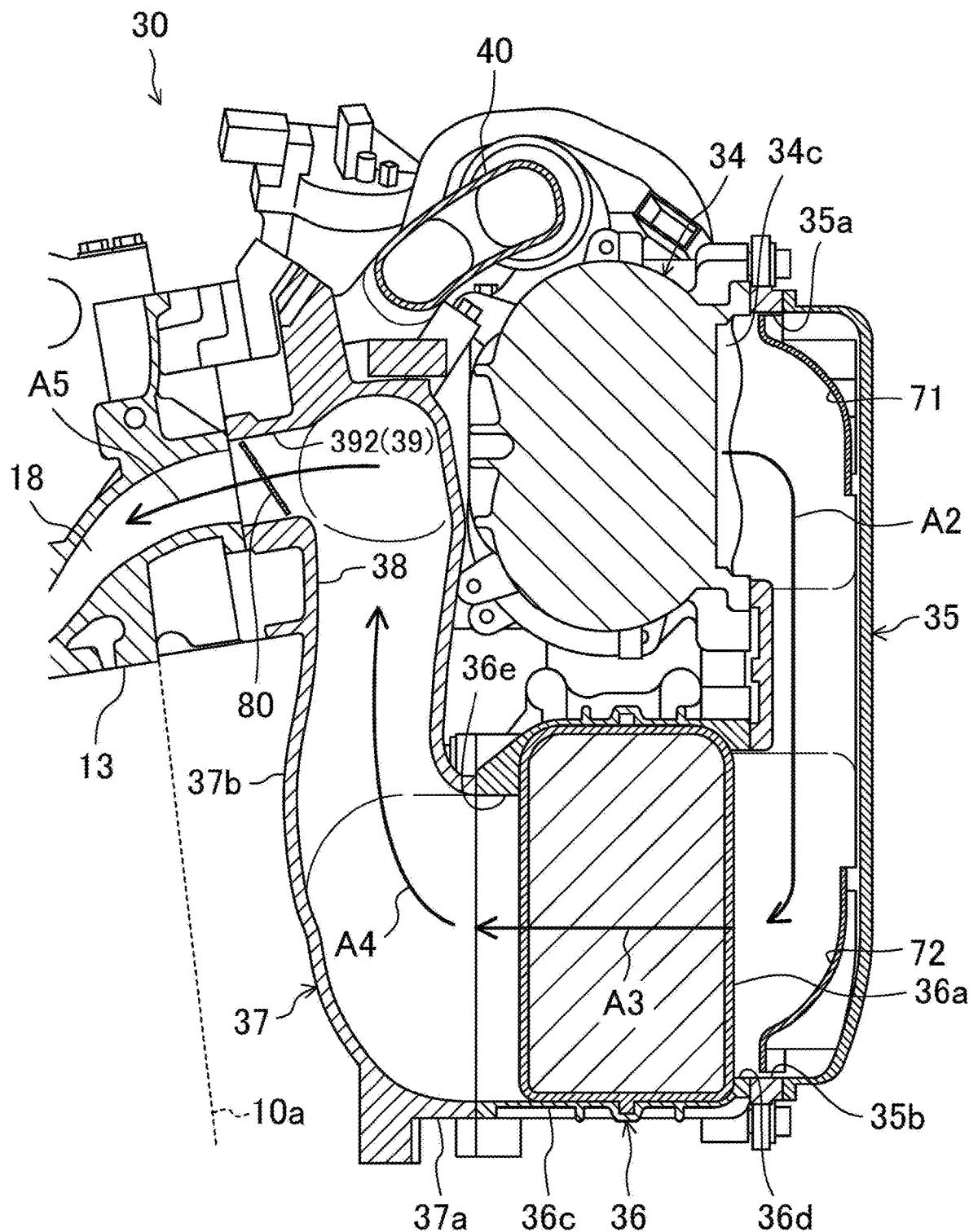
FIG. 7 is a longitudinal sectional view illustrating the passage configuration associated with the supercharger.
Figure 8:
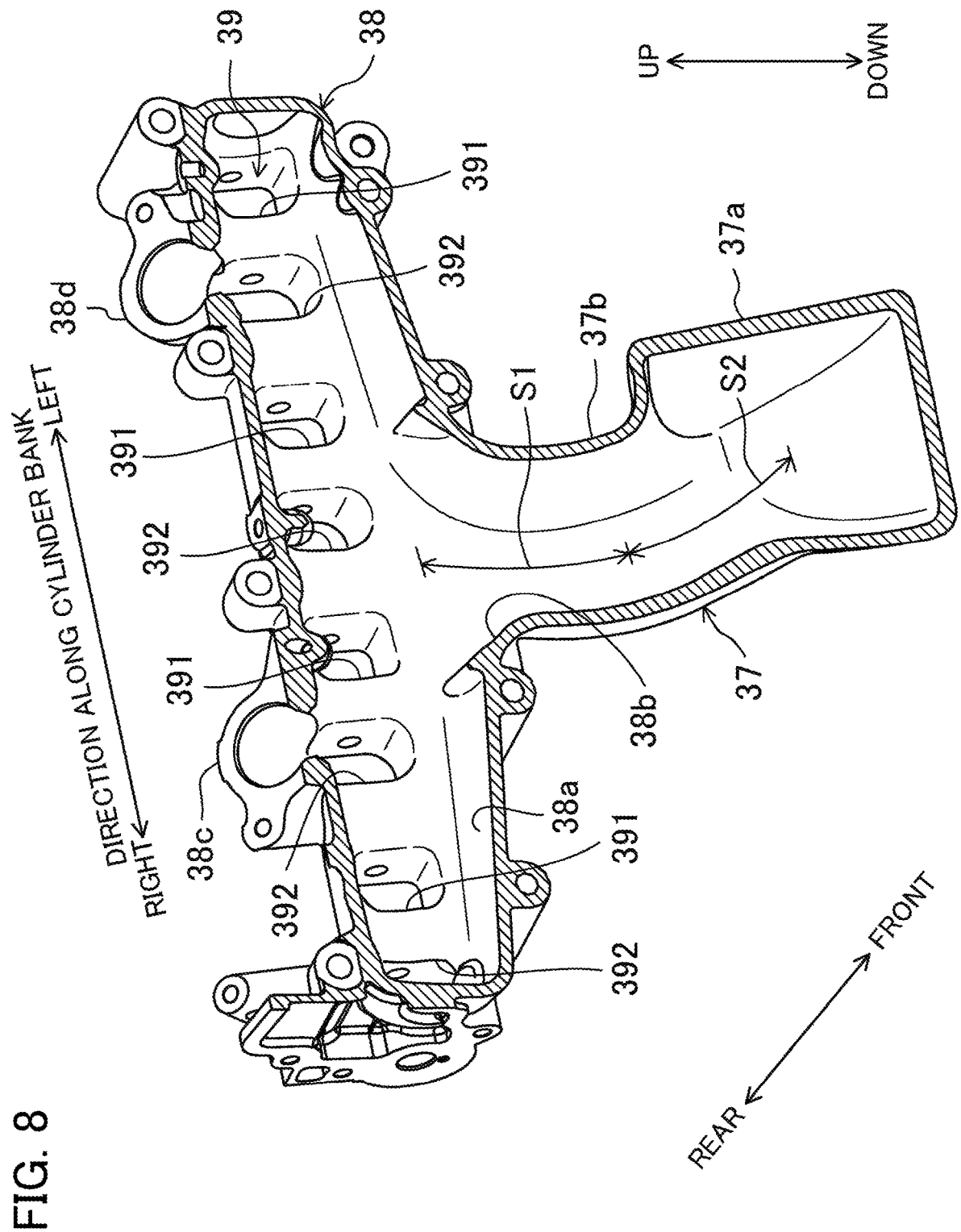
FIG. 8 is a perspective view illustrating a vertical section around a surge tank.
Figure 9:
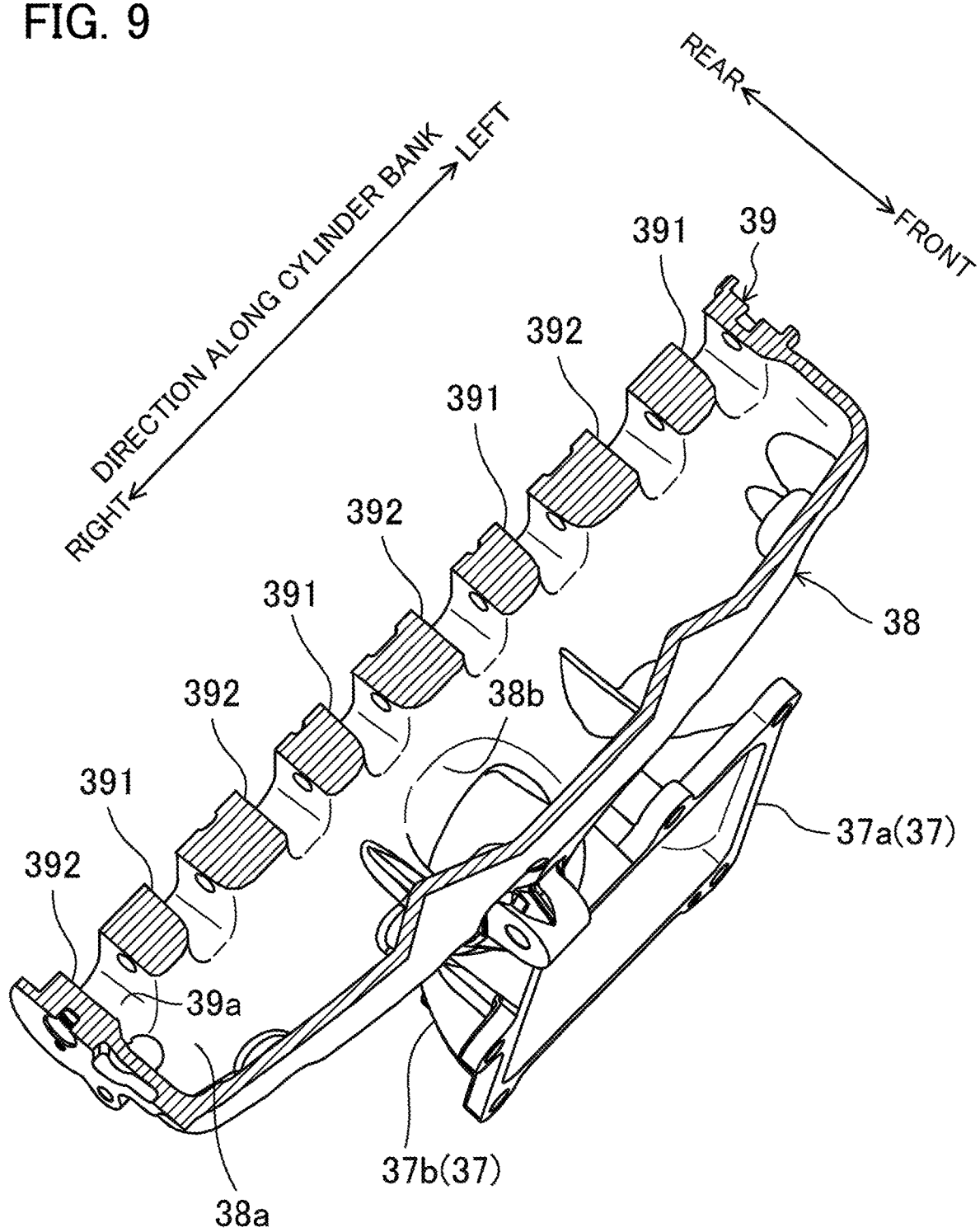
FIG. 9 is a perspective view illustrating a vertical section different from that of FIG. 8.

FIG. 4 illustrates an entire configuration of the intake path 30 as a unit as viewed from the front. FIG. 5 illustrates the entire configuration of the intake path 30 as viewed from the rear. FIG. 6 is a transverse sectional view illustrating a passage configuration of the intake path 30, which is associated with the supercharger 34. FIG. 7 is a longitudinal sectional view of the passage configuration. FIG. 8 is a perspective view illustrating a vertical section around the surge tank 38. FIG. 9 is a perspective view illustrating a vertical section different from that of FIG. 8.

The components of the intake path 30 are located in front of the engine body 10, specifically, in front of the mounting surface 10*a* described above. As shown in FIGS. 6 and 7, the mounting surface 10*a* is formed of the front outer surfaces of the cylinder head 13 and the cylinder block 12.

First, schematic arrangement of the components of the intake path 30 will be described.

As shown in FIGS. 2 and 4 to 8, the supercharger 34 is located opposite to the four cylinders 11, with the surge tank 38 interposed therebetween. A gap (distance) corresponding to the size of the surge tank 38 is provided between the rear surface of the supercharger 34 and the mounting surface 10*a*. The first passage 33 extends along the cylinder bank on the left of the supercharger 34, and is connected to the left end of the supercharger 34. The supercharger 34 and the intercooler 36 are adjacent to each other in an up/down direction. The second passage 35 extends in the up/down direction to connect the front of the supercharger 34 to the front of the intercooler 36. The surge tank 38 is located in the gap between the supercharger 34 and the mounting surface 10*a*, and opposite to the ends (inlets) of the intake ports 17 and 18, which are farther from the cylinders, with the independent passages 39 interposed therebetween. The third passage 37 extends through the gap between the intercooler 36 and the mounting surface 10*a*, and the gap between the supercharger 34 and the mounting surface 10*a*, and connects the rear of the intercooler 36 to the bottom of the surge tank 38 so that the intercooler 36 is located below the surge tank 38. The bypass passage 40 extends upward in a middle of the first passage 33, then extends inside the engine body 10 (to the right) so as to be connected to the upper part of the surge tank 38.

Next, the structures of the components of the intake path 30 will be described.

The first passage 33 is formed like a pipe extending substantially along the cylinder bank (i.e., in the right/left direction). The upstream part (left) of the first passage 33 is formed of a throttle body 33*a* containing the throttle valve 32. The throttle body 33*a* is formed like a short metal cylinder, and located on the left and in front of the mounting surface 10*a*, with openings on the ends of the throttle body 33*a* facing the right/left direction as shown in FIGS. 4 to 6. The upstream end (i.e., the left end) of the throttle body 33*a* is connected to the air cleaner 31 via a passage (not shown), while the downstream end (i.e., the right end) of the throttle body 33*a* is connected to a first passage body 33*b*, which is the downstream (right) part of the first passage 33.

As shown in FIG. 6, the first passage body 33*b* connects the throttle body 33*a* to the supercharger 34. Specifically, the first passage body 33*b* is formed like a long cylinder with openings on its ends facing the right/left direction. The first passage body 33*b* is located in front of the mounting surface 10*a* and coaxial with the throttle body 33*a*. More specifically, the diameter of the first passage body 33*b* gradually increases from the outer side toward the inside (i.e., from the left to the right) of the cylinder bank. As described above, the upstream end (i.e., the left end) of the first passage body 33*b* is connected to the downstream end of the throttle body 33*a*, while the downstream end (i.e., the right end) of the first passage body 33*b* is connected to a suction port of the supercharger 34.

A junction 33*c* is open in the first passage body 33*b* to join the EGR passage 52. As shown in FIG. 6, the junction 33*c* is formed in the rear surface of the part which is upstream of the first passage body 33*b*, and is connected to the downstream end of the EGR passage 52. The junction 33*c* is formed downstream of at least the throttle valve 32.

A branching portion (not shown) into the bypass passage 40 is also open in the first passage body 33*b*. This branching portion is formed on the top of the first passage body 33*b* close to the junction 33*c* (in substantially the same position as the junction 33*c* along gas flow) and is connected to the upstream end (a valve body 41*a*, which will be described later) of the bypass passage 40 (see FIGS. 4 and 5). As shown, for example, in FIG. 4, the upstream end of the bypass passage 40 is located more outward than (on the left of) the supercharger 34, the intercooler 36, four sets of the intake ports 17 and 18, and the surge tank 38 connected to the intake ports 17 and 18 via the respective independent passages 39, along the cylinder bank.

Thus, fresh air, which has been purified at the air cleaner 31 and flowed into the first passage 33, passes through the throttle valve 32, and then joins the external EGR gas, which has flowed from the junction 33c. In natural aspiration, the gas which has been obtained by joining the fresh air and the external EGR gas, flows via the branching portion described above into the bypass passage 40. In supercharging, this gas joins the gas which has flowed back through the bypass passage 40, and is sucked into the supercharger 34 through the downstream end of the first passage body 33b (see arrow A1 of FIG. 6).

Now, the passage configuration around the supercharger 34 and the passage configuration around the bypass passage 40 will be described sequentially.

Passage Configuration Around Supercharger

First, the passage configuration for sucking gas into the supercharger 34 will be described in detail.

As described above, the supercharger 34 according to this embodiment is a Roots supercharger. Specifically, the supercharger 34 includes a pair of rotors (not shown), each of which has a rotating shaft extending along the cylinder bank, a casing 34b housing the rotors, and a drive pulley 34d configured to rotate and drive the rotors. The supercharger 34 is coupled to the crankshaft 15 via a drive belt (not shown) wound around the drive pulley 34d. The electromagnetic clutch 34a described above is interposed between the drive pulley 34d and the rotors. Engagement and disengagement of the electromagnetic clutch 34a are alternated to transmit drive power via the crankshaft 15 to the supercharger 34 or cut off the transmission of the drive power.

The casing 34b is formed like a tube extending along the cylinder bank, and defines the space containing the rotors, and the passage of the gas flowing through the supercharger 34. Specifically, the casing 34b is substantially formed like a tube extending along the cylinder bank, and having an open left end an open front surface. As shown, for example, in FIG. 6, the casing 34b is located at a predetermined distance from a substantially central portion of the mounting surface 10a along the cylinder bank, and coaxial with the first passage 33.

A suction port, which sucks the gas compressed by the rotors, is open at the left longitudinal end of the casing 34b, which is connected to the downstream end (i.e., the right end) of the first passage 33. On the other hand, as shown in FIGS. 6 and 7, an outlet 34c, which discharges the gas compressed by the rotors, is open at the front (on the side further to the engine body 10) of the casing 34b, which is connected to the upstream end (i.e., the upper end) of the second passage 35. The outlet 34c of the supercharger 34 is one example of the "gas outlet."

The drive pulley 34d rotates and drives the rotors housed in the casing 34b. Specifically, the drive pulley 34d is formed like a shaft projecting from the right end of the casing 34b, and extending substantially coaxially with both the first passage 33 and the casing 34b. The drive belt is wound around the tip of the drive pulley 34d, and drives and couples the crankshaft 15 to the supercharger 34 depending on engagement or disengagement of the electromagnetic clutch 34a described above.

As shown, for example, in FIGS. 4, 6, and 7, the second passage 35 connects the supercharger 34 to the intercooler 36. The second passage 35 according to this embodiment extends in the up/down direction along the engine 1 so that the supercharger 34 and the intercooler 36 are adjacent to each other in the up/down direction. As shown in FIG. 7, both the ends of the second passage 35 in the up/down direction are open toward the rear (toward the engine body 10). The upper opening of the second passage 35 is connected to the front (specifically, the outlet 34c) of the casing 34b, while the lower opening of the second passage 35 is connected to the front (specifically, an opening 36d, which will be described later) of the intercooler 36. The second passage 35 is an example of the "intermediate passage."

The second passage 35 includes, in its middle position, a narrow region 35c for mounting an intake air temperature sensor 90. These configurations will be described later.

As described above, the intercooler 36 according to this embodiment is of a water-cooling type. As shown in FIGS. 4 to 7, the intercooler 36 includes a core 36a having a function of cooling gas, a connected portion 36b attached to a side of the core 36a, and a cooler housing 36c housing the core 36a. Although not described in detail, the connected portion 36b is connected to a water supply pipe, which supplies cooling water to the core 36a, and a water discharge pipe, which discharges the cooling water from the core 36a.

The core 36a is formed like a parallelepiped is located on the mounting surface 10a, with one side surface (rear surface) facing the mounting surface 10a. The front surface of the core 36a forms a surface, through which gas flows in, while the rear surface of the core 36a forms a surface, through which gas flows out. The front and rear surfaces are most wide among the surfaces of the core 36a. Although not shown, water tubes obtained by forming a thin plate into flat tubes are arranged in the core 36a. Corrugated fins are connected to the outer walls of the water tubes, for example, by brazing. This configuration allows introduction of the cooling water which has been supplied through water supply pipes into the water tubes, and cooling of the high-temperature gas. The cooling water which has become warm after cooling the gas, is discharged through water discharge pipes to the water tubes. The provided corrugated fins increase the surface areas of the water tubes to improve the effects of heat radiation.

As shown in FIG. 4, the connected portion 36b is a thin rectangular plate-like member attached to the right surface of the core 36a. The water supply and discharge pipes are connected to the water tubes via the connected portion 36b. The connected portion 36b forms the right sidewall of the intercooler 36, and defines the space housing the core 36a together with the cooler housing 36c.

The cooler housing 36c is located below the casing 34b, which forms the supercharger 34, defines the space housing the core 36a, and forms a passage of the intake path 30 that is interposed between the second passage 35 and the third passage 37.

Specifically, the cooler housing 36c is formed like a thin rectangular box with open front and rear surfaces, and located on the mounting surface 10a below the casing 34b, with the rear surface facing the mounting surface 10a. Like the casing 34b, this rear surface is located at a predetermined distance (see FIG. 7) from the mounting surface 10a of the engine body 10.

The opening 36d in the front surface of the cooler housing 36c is connected to the downstream end of the second passage 35, while an opening 36e in the rear surface is connected to the upstream end of the third passage 37. The right surface of the cooler housing 36c is also open. The opening servers as an insertion port when the core 36a houses the cooler housing 36c inside, and is blocked by the connected portion 36b. The opening 36d in the front surface of the cooler housing 36c is an example of the "gas inlet" of the intercooler 36. The opening 36d in this front surface may be hereinafter simply referred to as an "inlet."

The third passage 37 is formed integrally with the surge tank 38 and the independent passages 39, and connects the intercooler 36 to the surge tank 38 as shown in FIGS. 7 and 8. Specifically, the third passage 37 includes a collection part 37a and an introduction part 37b in this order from the upstream end of the third passage 37. The collection part 37a is engaged with the cooler housing 36c, and collects the gas which has passed the intercooler 36. The introduction part 37b guides the gas which has been collected by the collection part 37a, to the surge tank 38. The third passage 37 is provided below the surge tank 38 at least when mounted in the vehicle.

The collection part 37a is formed like a longitudinally thin box with an open front surface, that is, an open surface on the side closer to the cooler housing 36c. As shown in FIG. 7, this opening is connected to the opening 36e in the rear surface of the cooler housing 36c. The collection part 37a is located in the gap between the rear surface of the cooler housing 36c, and the mounting surface 10a of the engine body 10. In addition, the rear surface of the collection part 37a is connected to the upstream end of the introduction part 37b.

The introduction part 37b is formed as a curving pipe extending in the substantially up/down direction. The upstream end of the introduction part 37b is connected to the rear surface of the collection part 37a, while the downstream end of the introduction part 37b is connected to a central portion of the bottom of the surge tank (see FIGS. 8 and 9). As shown in, for example, FIG. 7, this introduction part 37b extends through the gap between the region from the rear surface of the collection part 37a to the rear surface of the casing 34b of the supercharger 34, and the mounting surface 10a of the engine body 10.

More specifically, as shown in FIG. 8, the upstream part of the introduction part 37b extends obliquely upward to the right from the portion of introduction part 37b, which is connected to the collection part 37a, while the downstream part of the introduction part 37b extends vertically upward toward the portion of the introduction part 37b, which is connected to the surge tank 38. This formation allows the downstream end of the introduction part 37b to extend substantially orthogonal to the gas flow in the independent passages 39, as viewed from one side of the cylinder bank (see FIG. 7).

The surge tank 38 is formed like a substantial cylinder extending along the cylinder bank, and has closed ends along the cylinder bank. As described above, this surge tank 38 is located opposite to the end of the intake ports 17 and 18, which is farther from the cylinders, with the independent passages 39 interposed therebetween (see FIG. 7). Together with this arrangement, the formation of the independent passages 39 in short cylindrical shapes places the surge tank 38 near the inlets (upstream ends) of the intake ports 17 and 18, as will be described later. This is advantageous in reducing the lengths of the passages (runners) from the surge tank 38 to the intake ports 17 and 18.

As shown in FIG. 9, the bottom of the surge tank 38 is connected to the downstream end of the third passage 37 (the introduction part 37b). An inlet 38b with a substantially circular cross-section is open at a central portion of an inner bottom surface 38a of the surge tank 38 (specifically, along the cylinder bank). Via this inlet 38b, the downstream end of the introduction part 37b is connected to the surge tank 38.

The inlet 38b has a larger diameter than the intake ports 17 and 18.

In the surge tank 38, the length from the inlet 38b to one end of the surge tank 38 along the cylinder bank, which is closer to the first cylinder 11A, is substantially equal to the length from the inlet 38b to the other end, which is closer to the fourth cylinder 11D. This configuration allows reliable distribution of intake air and is eventually advantageous in reducing differences in charging efficiencies among the cylinders.

As shown in FIG. 9, the surge tank 38 is connected to the upstream ends of the independent passages 39 arranged in a line in accordance with the order of the associated intake ports 17 and 18.

Specifically, four pairs of the independent passages 39 (i.e., eight independent passages 39 in total) are arranged along the cylinder bank, in the surface (rear surface) of the surge tank 38, which is closer to the engine body 10. When mounted in the vehicle, the eight independent passages 39 are formed as short cylindrical passages extending substantially straight backward. One ends (upstream ends) of the independent passages 39 communicate with the space inside the surge tank 38, while the other ends (downstream ends) of the independent passages 39 are open toward the engine body 10 (rearward).

Each of the four pairs of the independent passages 39 is associated with one of the four pairs of the intake ports 17 and 18. When an integral component formed of the third passage 37, the surge tank 38, and the independent passages 39 is mounted in the engine body 10, each of the independent passages 39 and associated ones of the intake ports 17 and 18 form a single passage.

As described above, each pair of the independent passages 39 includes an independent passage 391 associated with the first port 17, and an independent passage 392 associated with the second port 18. Thus, when the integral component of the third passage 37, the surge tank 38, and the independent passages 39 is mounted in the engine body 10, the first port 17 and the associated independent passage 391 form an independent passage, while the second port 18 and the associated independent passage 392 form another independent passage. In this manner, eight independent passages are formed.

The independent passage 392 connected to the second port 18 is provided with the SCV 80 described above (see FIGS. 5 and 11). A decrease in the opening degree of the SCV 80 reduces the flow rate of the gas passing through this second port 18, thereby relatively increasing the flow rate of the gas passing through the other, the first port 17.

As will be described later, the downstream part of the bypass passage 40 branches off into two passages. Both the downstream ends of the branched passages (hereinafter referred to as "branch passage 44b and 44c") are connected to the top of the surge tank 38.

In order to obtain such a structure, first and second introduction parts 38c and 38d are provided on the top of the surge tank 38. The first and second introduction parts 38c and 38d are spaced apart from each other along the cylinder bank, and allow the inside and outside of the surge tank 38 to communicate with each other.

Out of the two introduction parts, the first and second introduction parts 38c and 38d, the first introduction part 38c located on one side (right) in the direction along the cylinder bank is connected to the downstream end of one of the branch passages (hereinafter referred to as a "first branch passage") 44b. On the other hand, the second introduction part 38d on the other side (left) is connected to the downstream end of the other branch passage (hereinafter also referred to as a "second branch passage") 44c (see also FIG. 10).

Specifically, each of the first and second introduction parts 38c and 38d is formed like a short cylinder extending from the upper surface of the surge tank 38 obliquely upward and forward perpendicularly to the cylinder bank, as shown in FIG. 8.

As shown in FIG. 8, the first introduction part 38c faces a region around the independent passage 39₂ associated with the second port 18B of the second cylinder 11B. On the other hand, the second introduction part 38d faces a region around the independent passage 39₂ associated with the second port 18D of the fourth cylinder 11D.

The gas which has been sucked into the supercharger 34 passes through the "supercharging passage" configured in this manner, and reaches the cylinders 11.

Specifically, in supercharging, an output from the crankshaft 15 is transmitted through the drive belt and the drive pulley 34d to rotate the rotors during the operation of the engine 1. The rotation of the rotors allows the supercharger 34 to compress and then discharge the gas which has been sucked through the first passage 33, through the outlet 34c. The discharged gas flows into the second passage 35 located in front of the casing 34b.

As indicated by arrow A2 of FIG. 7, the gas which has flowed into the second passage 35 after being discharged from the supercharger 34, flows forward from the outlet 34c of the supercharger 34, and then flows downward along the second passage 35. The gas which has flowed downward, reaches a lower part of the second passage 35, and then flows backward toward the intercooler 36.

Then, as indicated by arrow A3 of FIG. 7, the gas which has passed through the second passage 35, flows inside the cooler housing 36c through the opening 36d in the front surface, and then flows backward from the front of the cooler housing 36c. The gas which has flowed inside the cooler housing 36c, is cooled with cooling water supplied to the water tubes, when passing through the core 36a. The cooled gas flows out of the opening 36e in the rear surface of the cooler housing 36c, and then flows into the third passage 37.

As indicated by arrow A4 of FIG. 7, the gas which has flowed from the intercooler 36 into the third passage 37, passes through the collection part 37a, flows obliquely upward along the upstream part of the introduction part 37b (see also section S1 of FIG. 8), and then flows vertically upward to the right along the downstream part of the introduction part 37b (see also section S2 of FIG. 8). As indicated by arrow A5 of the figure, the gas which has passed through the introduction part 37b, flows into the space in a substantially central portion of the surge tank 38 in the direction along the cylinder bank, is stored in the surge tank 38 temporary, and then supplied via the independent passages 39 to the cylinders 11.

Configuration of Bypass Passage

Next, the configuration of the bypass passage 40 will be described in detail.

Figure 10:
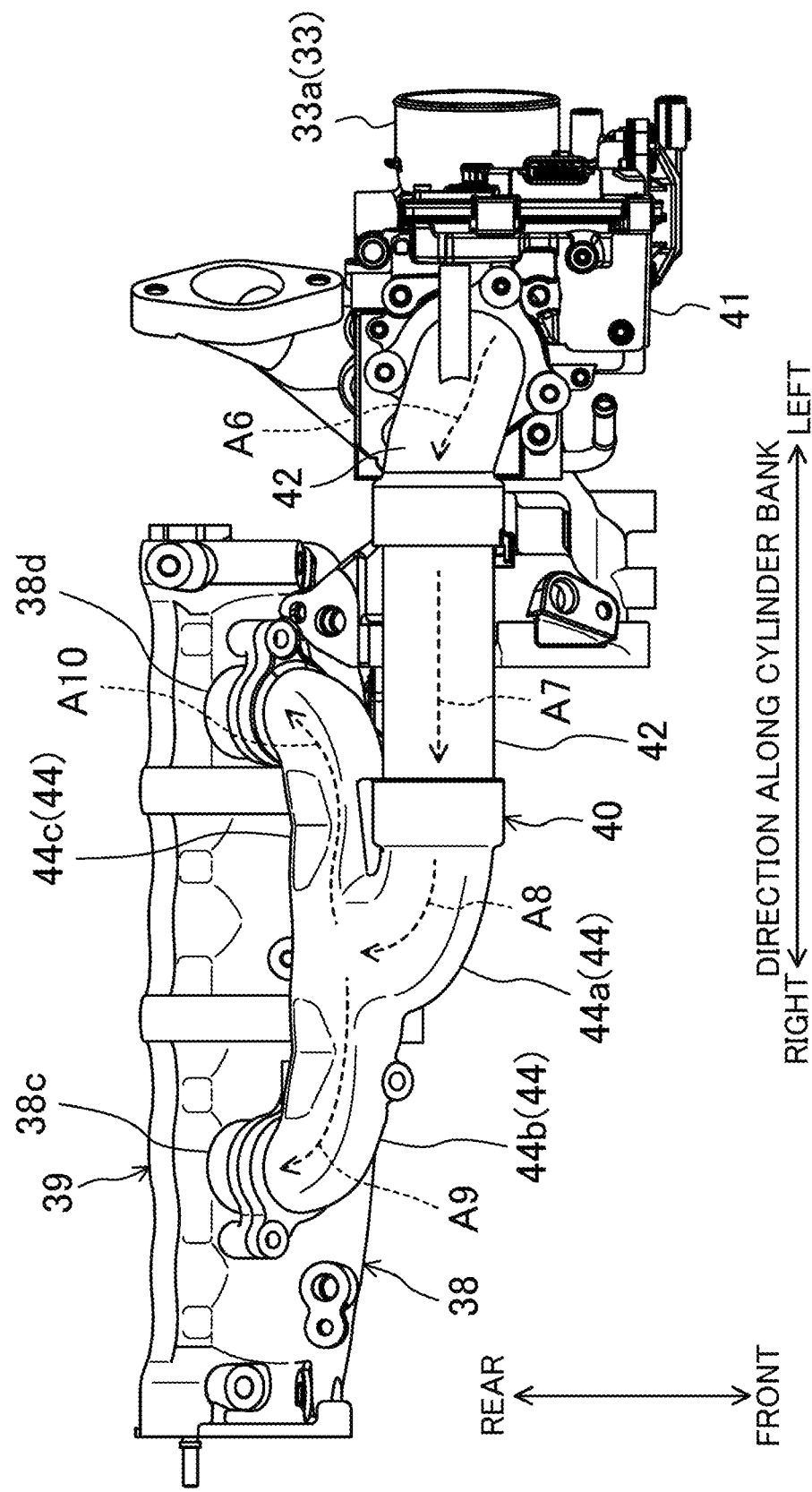
FIG. 10 illustrates a passage configuration associated with a bypass passage as viewed from above.

FIG. 10 illustrates the configuration of the bypass passage 40 as viewed from above.

The bypass passage 40 extends upward from the branching portion on the top of the first passage body 33b, and then extends substantially straight to the right (see also FIGS. 4 and 5). The portion of the bypass passage 40 extending toward the right changes the direction to head obliquely downward and backward after reaching the region around the center of the surge tank 38 (specifically, the center in the direction along the cylinder bank), and then branches off into two passages. Each of the passages is connected to the top of the surge tank 38.

Specifically, the bypass passage 40 includes the valve body 41a, a curved pipe 42, a straight pipe 43, and a branch pipe 44 in this order from the upstream end along the gas flow. The valve body 41a contains the bypass valve 41. The curved pipe 42 changes the flow direction of the gas which has passed through the valve body 41a. The straight pipe 43 guides the gas which has passed through the curved pipe 42, to the right. The branch pipe 44 guides the gas which has passed through the straight pipe 43, obliquely downward and backward and then branches off into two passages so as to be connected to the surge tank 38.

The valve body 41a is formed like a short cylinder, and is located above the first passage 33 and on the left of the supercharger 34, with the opening on each side facing upward or downward, as shown in FIG. 5. Like the first passage 33, the valve body 41a is located in front of the region of the mounting surface 10a around the left end. The upstream end (lower end) of the valve body 41a is connected to the branch portion of the first passage 33, while the downstream end (upper end) of the valve body 41a is connected to the upstream end of the curved pipe 42.

The curved pipe 42 is formed as an elbow-like pipe joint, and is located above the first passage 33, eventually the valve body 41a, with each opening facing downward or the right. Thus, the gas, which flowed into the curved pipe 42, flows in the direction perpendicular to the main stream of the gas of the first passage 33 (i.e., vertically upward), and is then oriented along the curve of the curved pipe 42. As a result, the gas flowing through the curved pipe 42 flows slightly backward as viewed along the cylinder axis (see FIG. 10) and flows inward (from the left to the right) along the cylinder bank. Like the first passage 33 and the valve body 41a, the curved pipe 42 is located in front of the region of the mounting surface 10a around the left end. As already described, the upstream end (lower end) of the curved pipe 42 is connected to the downstream end (upper end) of the valve body 41a, while the downstream end (right end) of the curved pipe 42 is connected to the upstream end of the straight pipe 43.

The straight pipe 43 is formed like a long cylinder (specifically, a cylinder extending from one side (left) to the other side (right) along the cylinder bank), and is located above the first passage 33 or the supercharger 34, with the opening at each end facing to the right or left, as shown in FIGS. 4 and 5. As already described, the upstream end (left end) of the straight pipe 43 is connected to the downstream end (right end) of the curved pipe 42, while the downstream end (right end) of the straight pipe 43 is connected to the upstream end of the branch pipe 44.

The branch pipe 44 includes a bent passage 44a bent like an elbow, and the two branch passages 44b and 44c branching off like a tournament chart from the downstream end of the bent passage 44a. The branch pipe 44 is located above the supercharger 34 and the surge tank 38, with the upstream end of the bent passage 44a facing the left, and both the branch passages 44b and 44c facing obliquely downward and backward.

Specifically, the bent passage 44a is bent at a substantially right angle to head obliquely downward and backward, as it goes from the left to the right. As shown in FIG. 10, the rear end of this bent passage 44a branches off like a substantial T-shape into the two branch passages 44b and 44c as viewed along the cylinder axis.

The lengths of the two branch passages 44b and 44c are substantially equal to each other. One of the branch passages, the first branch passage 44b extends from the branch point to the right along the cylinder bank and is then bent obliquely downward and backward. On the other hand, the other branch passage, the second branch passage 44c extends from the branch point to the left along the cylinder bank and is then bent obliquely downward and backward. As described above, the downstream ends of the two branch passages 44b and 44c are connected to the first introduction part 38c and the second introduction part 38d, respectively, which are formed on the top of the surge tank 38.

In natural aspiration, the gas, which flowed into the bypass passage 40, passes through the components 41 to 44 of the bypass passage 40 to reach the cylinders 11.

That is, the gas which has passed through the throttle valve 32, flows from a middle of the first passage 33 into the valve body 41a of the bypass valve 41 in accordance with the opening or closing of the bypass valve 41.

As indicated by arrow A6 of FIG. 10, the gas which has flowed through the valve body 41a into the curved pipe 42, flows vertically upward, and then flows slightly rearward to the right.

Then, as indicated by arrow A7 of FIG. 10, the gas which has passed through the curved pipe 42, flows to the right along the straight pipe 43, and then flows into the branch pipe 44. As indicated by arrows A8 to A10 of the figure, the gas which flowed into the branch pipe 44, passes through the bent passage 44a, and is distributed to the first and second branch passages 44b and 44c. Then, each distributed gas portion flows into the surge tank 38. The gas which flowed into the surge tank 38, is sucked through the independent passages 39 into the cylinders 11.

On the other hand, in supercharging, the gas which has flowed back from the surge tank 38 to the bypass passage 40, flows through the components 41 to 44 of the bypass passage 40 in the direction opposite to the direction described above, and flows into the first passage 33.

Configuration Associated with Placement of Intake Air Temperature Sensor

Figure 11:
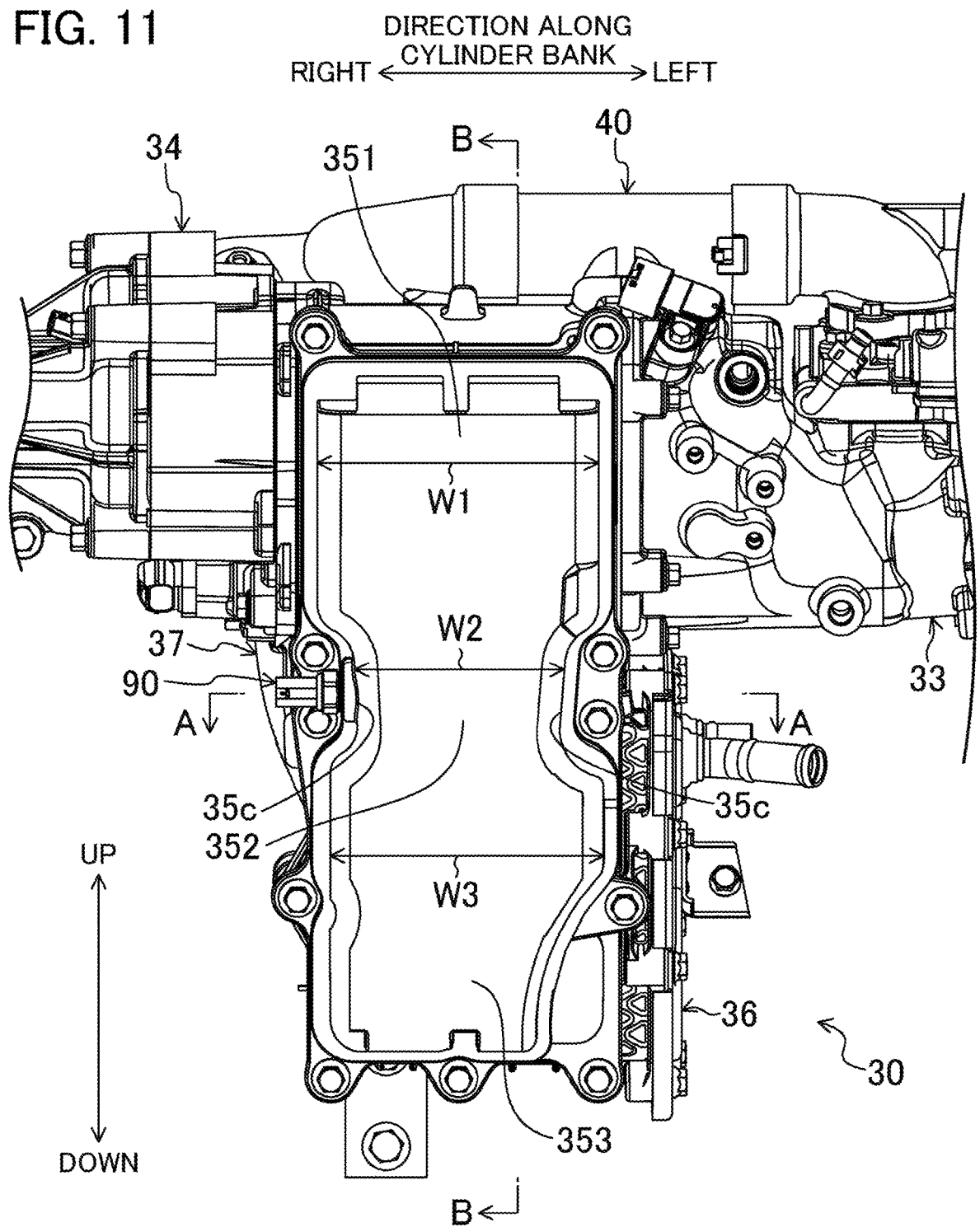
FIG. 11 illustrates a passage configuration associated with a second passage as viewed from the front.
Figure 12:
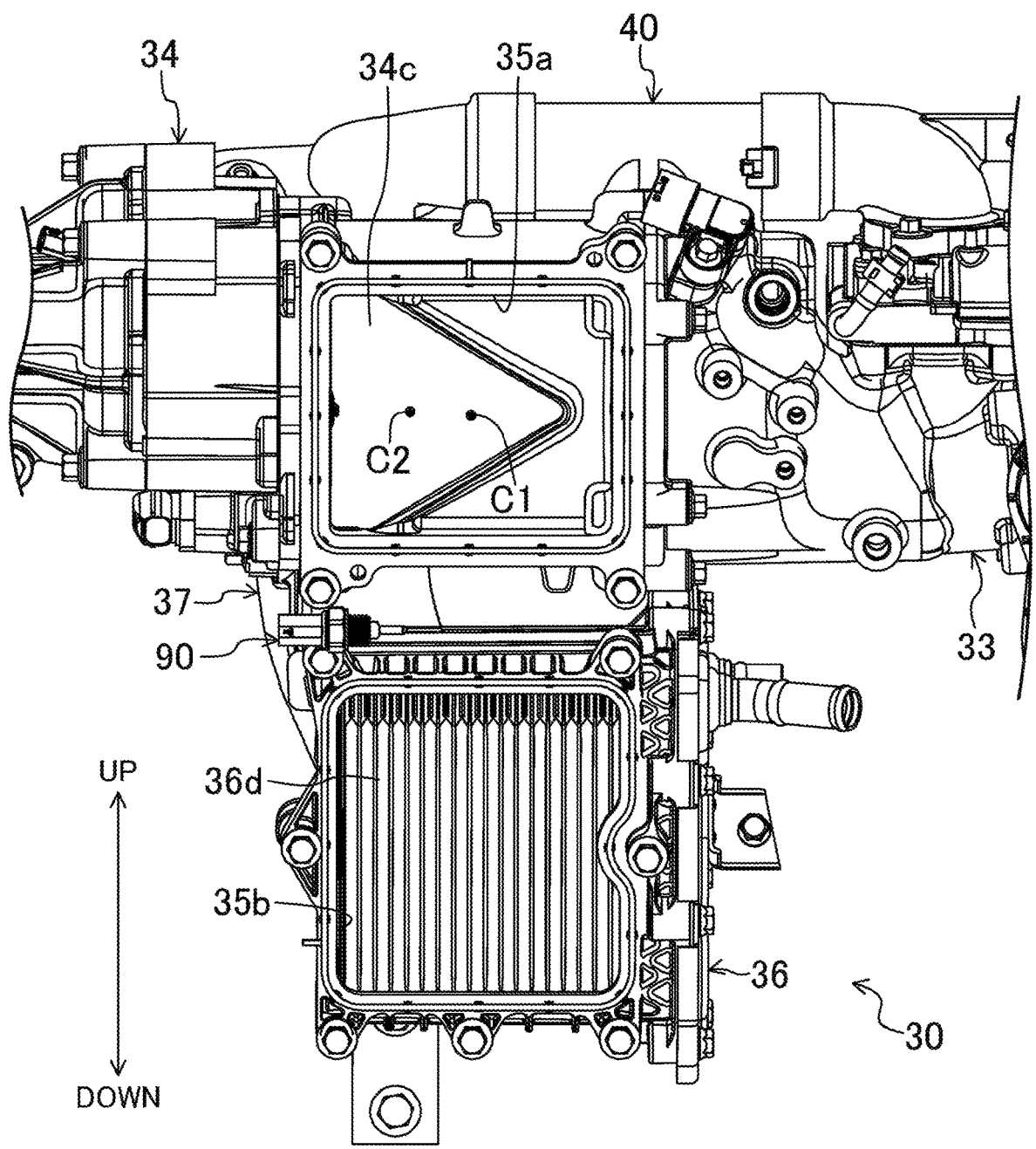
FIG. 12 corresponds to FIG. 11, in which a duct forming the second passage is detached.
Figure 13:
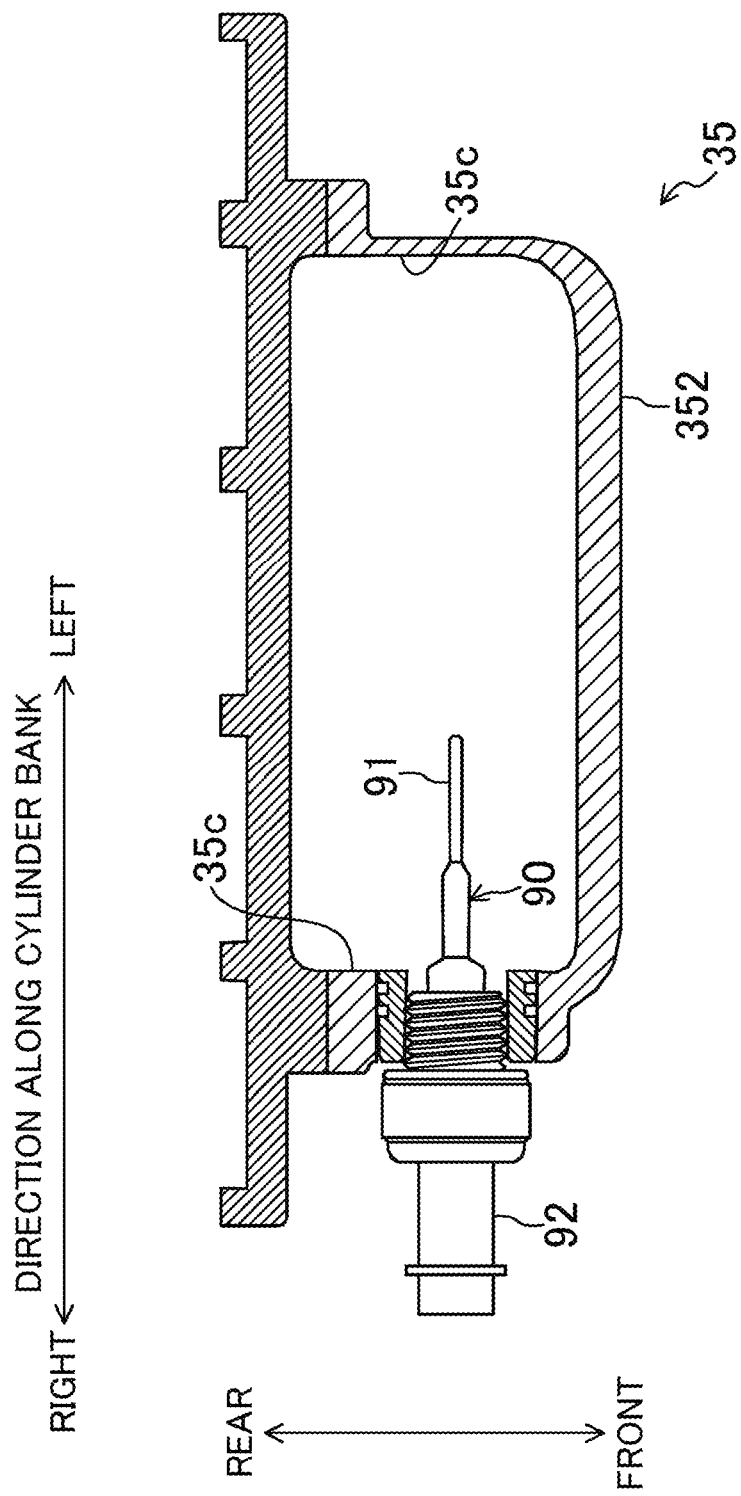
FIG. 13 is a partially enlarged view illustrating a cross-section taken along line A-A of FIG. 11.
Figure 14:
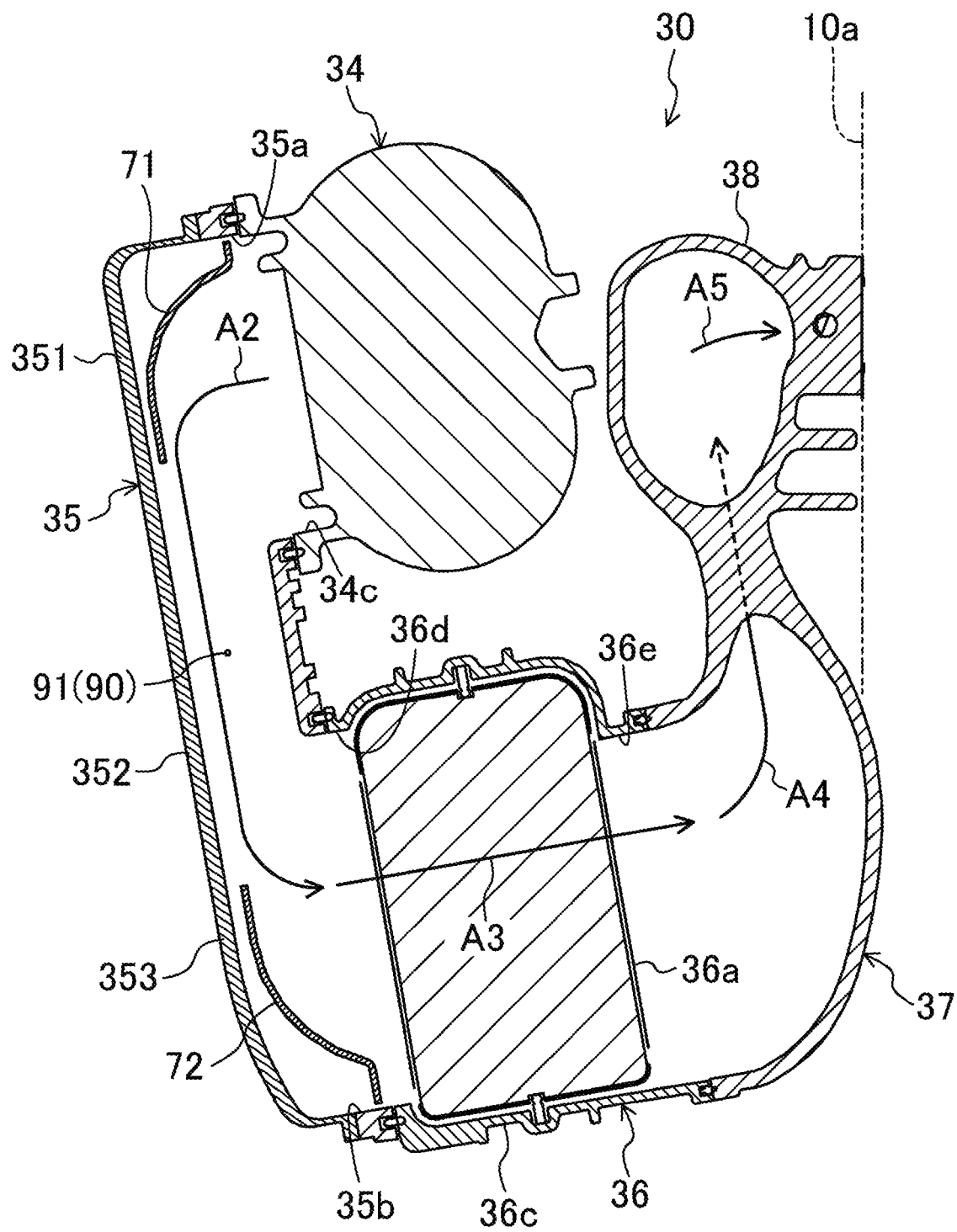
FIG. 14 partially illustrates a cross-section taken along line B-B of FIG. 11.
Figure 15:
FIG. 15 illustrates the duct forming the second passage as viewed from the rear.

FIG. 11 illustrates a passage configuration associated with the second passage 35 as viewed from the front. FIG. 12 corresponds to FIG. 11, in which a duct forming the second passage is detached. FIG. 13 is a partially enlarged view illustrating a cross-section taken along line A-A of FIG. 11. FIG. 14 partially illustrates a cross-section taken along line B-B of FIG. 11. FIG. 15 illustrates the duct forming the second passage 35 as viewed from the rear.

The engine 1 includes the ECU for operating the engine 1. The ECU determines the operation mode of the engine 1 and calculates control variables of various actuators based on detection signals output from various sensors such as the intake air temperature sensor 90 described above. The ECU outputs control signals corresponding to the calculated control variables to the injector 6, the spark plug 25, the electric intake VVT 23, the electric exhaust VVT 24, the fuel supply system 61, the throttle valve 32, the EGR valve 54, the electromagnetic clutch 34a of the supercharger 34, and the bypass valve 41 to operate the engine 1.

The operating ranges of the engine 1 are classified based on, for example, engine speeds and loads. The ECU controls the actuators to represent the operation mode corresponding to the operating ranges.

For example, in an operating range at a load lower than a predetermined load, the engine 1 is operated by natural aspiration (that is, the electromagnetic clutch 34a is disengaged to fully open the bypass valve 41). On the other hand, in an operating range at a load higher than the predetermined load, the supercharger 34 is driven to supercharge the gas to be introduced into the cylinders 11 (i.e., the electromagnetic clutch 34a is engaged to adjust the opening degree of the bypass valve 41).

If the temperature of the gas discharged from the supercharger 34 excessively rises in the high-load operating range, the supercharger 34 itself is overheated, which may reduce the reliability. Thus, the use of the supercharger 34 requires monitoring of the temperature of the gas discharged from the supercharger 34 as appropriate so that the temperature is lower than a predetermined upper limit.

The operation of the engine 1 requires knowledge of various state quantities such as the amount of heat dissipation at the intercooler 36. The knowledge of such state quantities requires detection of the gas temperature, for example, around the inlet 36d of the intercooler 36.

In order to satisfy these demands, the following measure is conceivable as an example. The second passage 35, which connects the supercharger 34 to the intercooler 36, with the intake air temperature sensor 90 to detect the gas temperature at a position downstream of the supercharger 34 and upstream of the intercooler 36.

However, in this configuration, pulsation in the discharge pressure of the supercharger 34 or jet of the gas discharged from the supercharger 34 may cause non-uniform distribution of the gas temperature in the second passage (intermediate passage) 35. Rather, non-uniform temperature distribution may occur when undischarged gas is compressed in the supercharger 34. Such non-uniform distribution is disadvantageous in stabilizing the detection result of the gas temperature.

To address the problem, providing a screw in a middle of the second passage (intermediate passage) 35 to stir the gas is conceivable. It is however not preferred in view of the fuel efficiency, if the energy needed for the action is taken into account. Providing, for example, a fin in the second passage (intermediate passage) 35 is also conceivable. However, this increases the intake resistance, and is thus disadvantageous.

As a countermeasure, the present inventors thought of an improved shape of the second passage 35, and a suitable position for mounting the intake air temperature sensor 90 to stabilize the detection result of the intake air temperature sensor 90 without using any additional member.

The shape of the second passage 35, and the configuration associated with the position for mounting the intake air temperature sensor 90 will now be described in detail.

As shown in FIGS. 11 and 12, the supercharger 34 and the intercooler 36 are adjacent to each other in an up/down direction at a predetermined distance. That is, the gap is provided between the supercharger 34 and the intercooler 36 in the up/down direction (see also FIGS. 7 and 14).

Both the outlet 34c of the supercharger 34 and the inlet 36d of the intercooler 36 are open in a predetermined opening direction (i.e., from the back to the front of the paper in FIG. 11, and forward in this example), and are located in the substantially same plane as shown in FIG. 7. This predetermined opening direction is an example of the "same direction."

As can be seen from FIG. 12, the outlet 34c of the supercharger 34 is formed as a triangular opening facing the right/left direction, with one side extending in the up/down direction and the other two side extending to the left, as the outlet 34c is viewed from the front. On the other hand, the inlet 36d of the intercooler 36 is open in a substantially rectangular shape with each side extending upward, downward, to the right, or to the left. As viewed from the front, both the size of the outlet 34c in the direction extending from the outlet 34c to the inlet 36d (i.e., in the up/down direction) and the size of the outlet 34c in a direction orthogonal to the direction (i.e., in the right/left direction) are smaller than the size of the inlet 36d. The outlet 34c is narrower than the inlet 36d.

As already described, the outlet 34c and the inlet 36d are connected together via the second passage 35. Specifically, as shown in FIG. 11, the second passage 35 is formed like a prismatic duct, which extends in the up/down direction and is thin in the right/left direction, with each end in the up/down direction facing backward (see also FIGS. 7 and 14).

Specifically, the second passage 35 is formed as a thin passage with a smaller depth in the opening direction described above (longitudinally) than widths W1 to W3 in the right/left direction.

The second passage 35 extends forward in the opening direction from an upstream end 35a that is connected to the outlet 34c, and is then bent at the substantially right angle toward the gas inlet 36d (downward in this example). After that, the second passage 35 extends substantially straight downward, is then bent again at the substantially right angle toward the gas inlet 36d (rearward in this example), and is connected to the inlet 36d via the opening of a downstream end 35b. With this configuration, the second passage 35 has a substantial U-shape that opens generally upwardly as shown in FIG. 7 as viewed perpendicularly to the cylinder bank (particularly, from the right).

As the outlet 34c of the supercharger 34 is viewed from the front in the direction orthogonal to the cylinder bank (i.e., in the front view of the outlet 34c with the cylinder bank viewed in the right/left direction), a central portion (center C2) of the outlet 34c is offset from a central portion (center C1) of the upstream end 35a of the second passage 35 to one side (the right in this embodiment) of the cylinder bank. Specifically, the upstream end 35a of the second passage 35 is open in a rectangular shape shown in FIG. 12 and is offset to the left from the outlet 34c of the supercharger 34 in a front view. More specifically, the center C1 of the upstream end 35a (e.g., the center of gravity of the square corresponding to the opening of the upstream end 35a) is offset to the left from the center C2 of the outlet 34c (e.g., the center of gravity of a triangle corresponding to opening of the outlet 34c), which is open in a triangular shape. On the other hand, the downstream end 35b of the second passage 35 and the inlet 36d of the intercooler 36 are both open in a rectangular shape, and are located in substantially the same position in a front view.

The second passage 35 includes, in its middle position, the narrow region 35c with a smaller cross-sectional area than the part of the second passage 35 extending from the upstream end 35a to the middle position.

Specifically, the second passage 35 includes a supercharger-side part 351, a connecting part 352, and a cooler-side part 353. The supercharger-side part 351 extends from the upstream end 35a of the second passage 35 to the narrow region 35c. The connecting part 352 includes the narrow region 35c. The cooler-side part 353 extends from the narrow region 35c to the downstream end 35b of the second passage 35.

Specifically, the supercharger-side part 351 serves as a passage extending forward from the outlet 34c and then bent downward toward the gas inlet 36d. The supercharger-side part 351 is formed such that its width W1 in the right/left direction is equal to the width W3 of the cooler-side part 353 in the same direction (i.e., W1=W3), as the mounting surface 10a viewed from the front. Thus, the cross-sectional area of the supercharger-side part 351 is substantially equal to the cross-sectional area of the cooler-side part 353.

As shown, for example, in FIGS. 7, 14, and 15, a first punched plate 71 having numbers of through holes is provided at the corner of the supercharger-side part 351 bent downward. As shown, for example, in FIGS. 7 and 14, the first punched plate 71 is attached to the inner wall of the second passage 35, while being curved like a substantially circular arc along the gas flow through the second passage 35, as viewed from one side of the cylinder bank.

On the other hand, the cooler-side part 353 serves as a passage extending forward from the inlet 36d and then bent upward toward the outlet 34c. The cooler-side part 353 is formed such that its width W3 in the right/left direction is larger than or equal (substantially equal in this exemplary configuration) to the size of the inlet 36d in the same direction, as the mounting surface 10a viewed from the front. This configuration allows the gas which has passed through the cooler-side part 353, to pass the whole opening of the inlet 36d at least in the right/left direction. This configuration is advantageous in bringing the gas into contact with the entire front surface of the core 36a.

As shown, for example, in FIGS. 7, 14, and 15, a second punched plate 72 is provided at the corner of the cooler-side part 353 bent upward. The second punched plate 72 has substantially the same configuration as the first punched plate 71. The second punched plate 72 is also attached to the inner wall of the second passage 35, while being curved like a substantially circular arc along the gas flow through the second passage 35.

The connecting part 352 serves as a passage extending substantially straight in the up/down direction so as to connect the downstream end of the supercharger-side part 351, which is open downward, and the upstream end of the cooler-side part 353, which is open upward. The connecting part 352 has the narrow region 35c described above in the position overlapping the gap between the supercharger 34 and the intercooler 36 in a front view.

The narrow region 35c is formed of a pair of right and left constricted portions to narrow the connecting part 352 relative to the supercharger-side part 351 and the cooler-side part 353. That is, the width W2 of the narrow region 35c is smaller than both the width W1 of the supercharger-side part 351 and the width W3 of the cooler-side part 353 (W2<W1=W3). The narrow region 35c may be formed of one of the right and left constricted portions instead of the pair of right and left constricted portions.

The narrow region 35c forms recesses in the outer surface of the second passage 35. Specifically, the second passage 35 has substantially a uniform thickness. Thus, formation of the narrow region 35c in the middle of the second passage 35 recesses the outer surface of the second passage 35.

The narrow region 35c configured in this manner is provided with the intake air temperature sensor 90, which detects the temperature of the gas flowing through the position corresponding to the narrow region 35c of the second passage 35. As will be described below in detail, such arrangement stabilizes the detection result of the intake air temperature sensor 90.

Specifically, the intake air temperature sensor 90 according to this embodiment is a thermocouple temperature sensor including a detector 91 and a fixed portion 92. The fixed portion 92 is located at the base end of the intake air temperature sensor 90 and exposed to the outside of the second passage 35. The detector 91 is provided at the distal end opposite to this fixed portion 92 and inserted inside the second passage 35. The intake air temperature sensor 90 is not limited to the thermocouple temperature sensor.

The fixed portion 92 functions as a boss of the intake air temperature sensor 90 and is fixed inside the outer surface of the right one of the recesses of the second passage 35, which are formed of the narrow region 35c. With this configuration, the intake air temperature sensor 90 overlaps the gap between the supercharger 34 and the intercooler 36 in the up/down direction as shown in FIG. 12.

On the other hand, the detector 91 at the distal end functions to detect the gas temperature, and projects from the fixed portion 92 to the left as shown in, for example, FIG. 13, to be inserted inside the connecting part 352 (see, e.g., FIG. 13).

A change in the amount of projection of the detector 91 adjusts the detection performance. For example, a large amount of projection of the detector 91 spaces the detector 91 apart from the (right) inner wall surface of the connecting part 352. This reduces the effect of the inner wall surface of the connecting part 352 on the gas flow in the detection of the gas temperature, and eventually the influences of the effect on the detection result. On the other hand, a relatively small amount of projection allows the detector 91 to come closer to the inner wall surface of the connecting part 352. This prevents or reduces breakage of the detector 91 due to, for example, gas flow. In this embodiment, the amount of projection is set to enable prevention or reduction in both the effect of the wall surface, and breakage.

The intake air temperature sensor 90 according to this embodiment is offset in the direction in which the outlet 34c is offset (i.e., to the right). As shown in FIG. 12, the tip of the detector 91 is located closer to the center C2 of the outlet 34c than the center C1 of the upstream end 35a in the right/left direction. Specifically, the intake air temperature sensor 90 is offset from a central portion of the narrow region 35c in the direction along the cylinder bank to the one side (the right in this embodiment) of the cylinder bank.

Figure 16A:
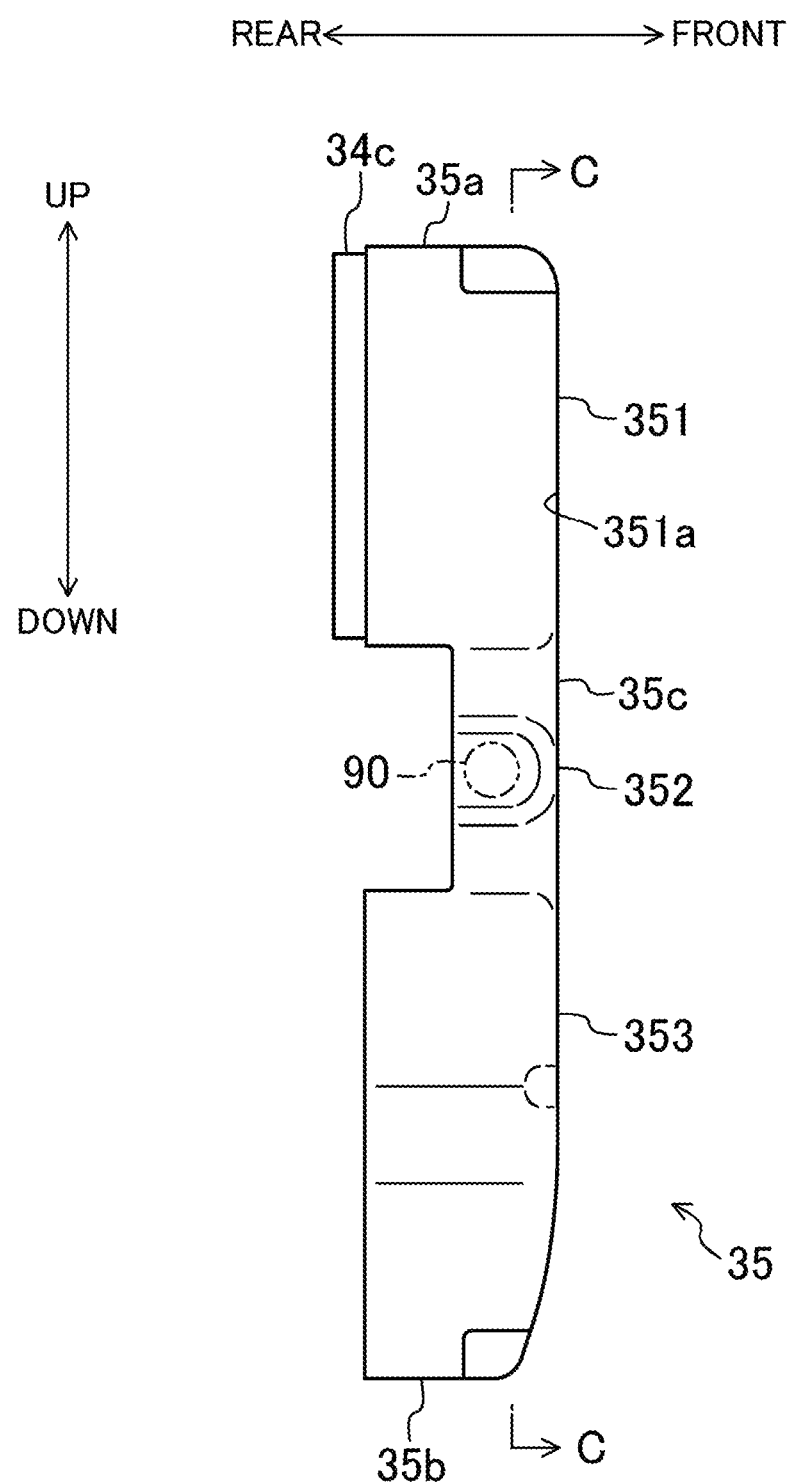
FIG. 16A is a schematic view of the second passage as viewed from the right.
Figure 16B:
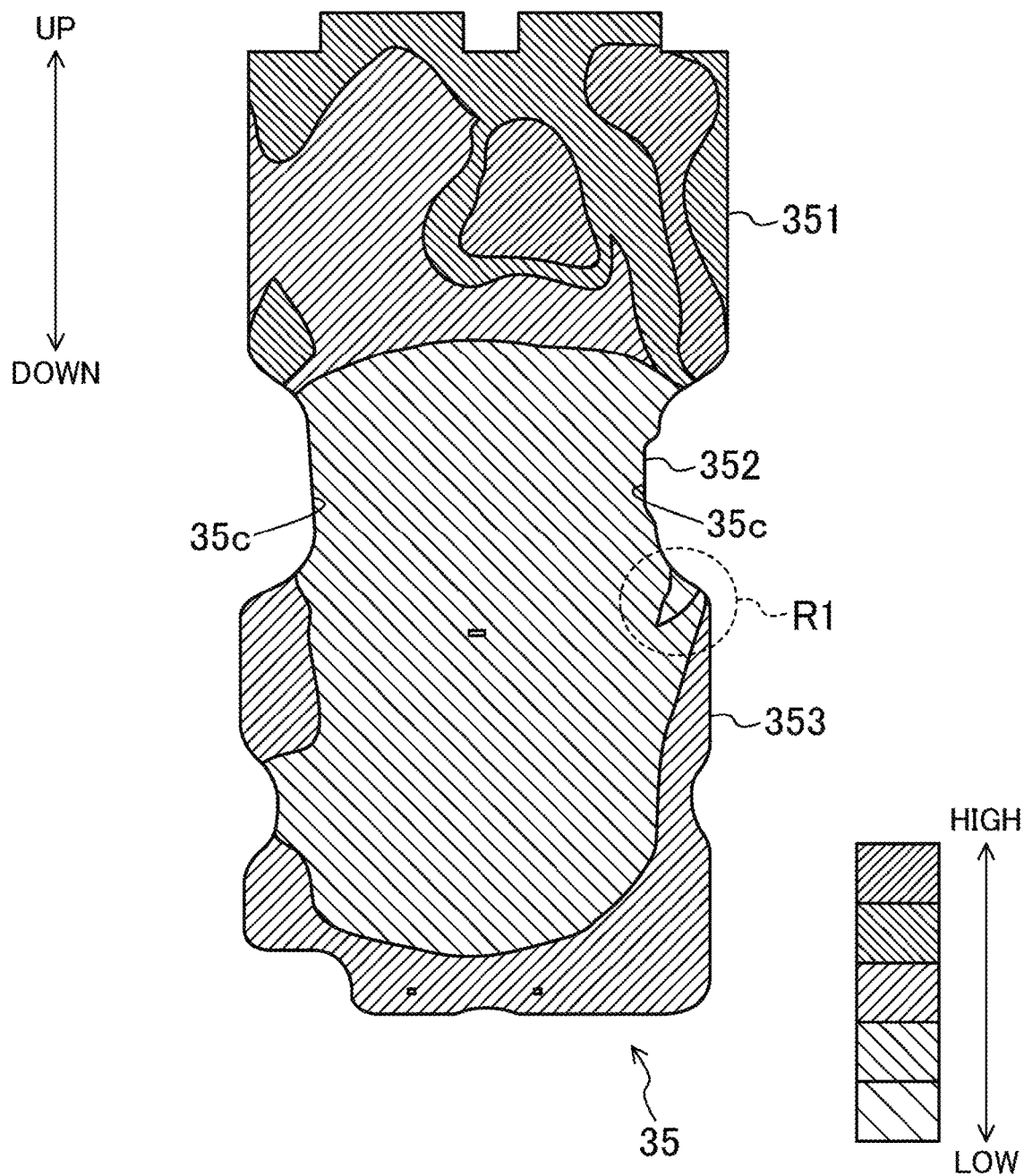
FIG. 16B is a contour diagram illustrating gas temperature distribution in the second passage in the cross-section taken along line C-C.
Figure 17A:
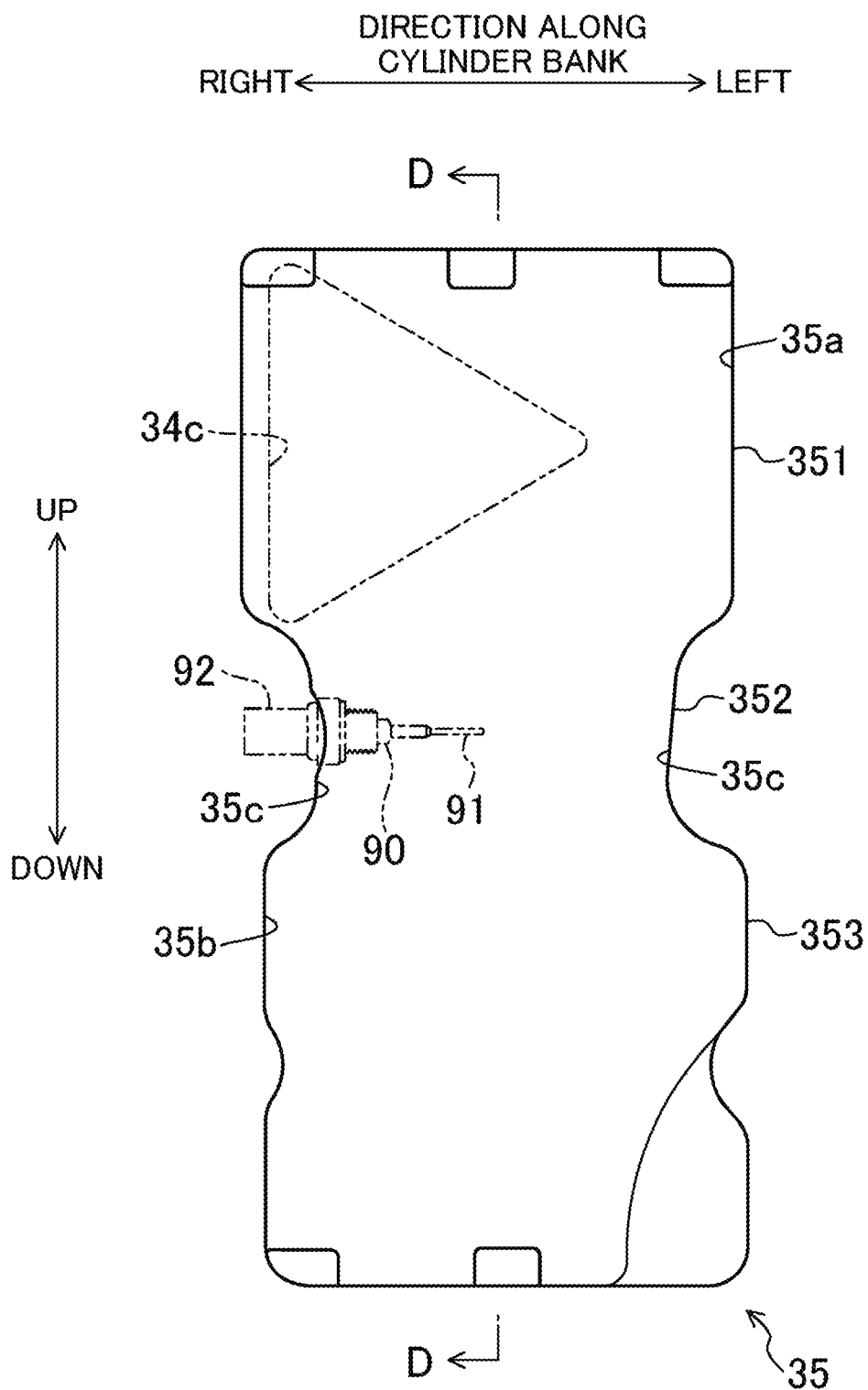
FIG. 17A is a schematic view of the second passage as viewed from the front.
Figure 17B:
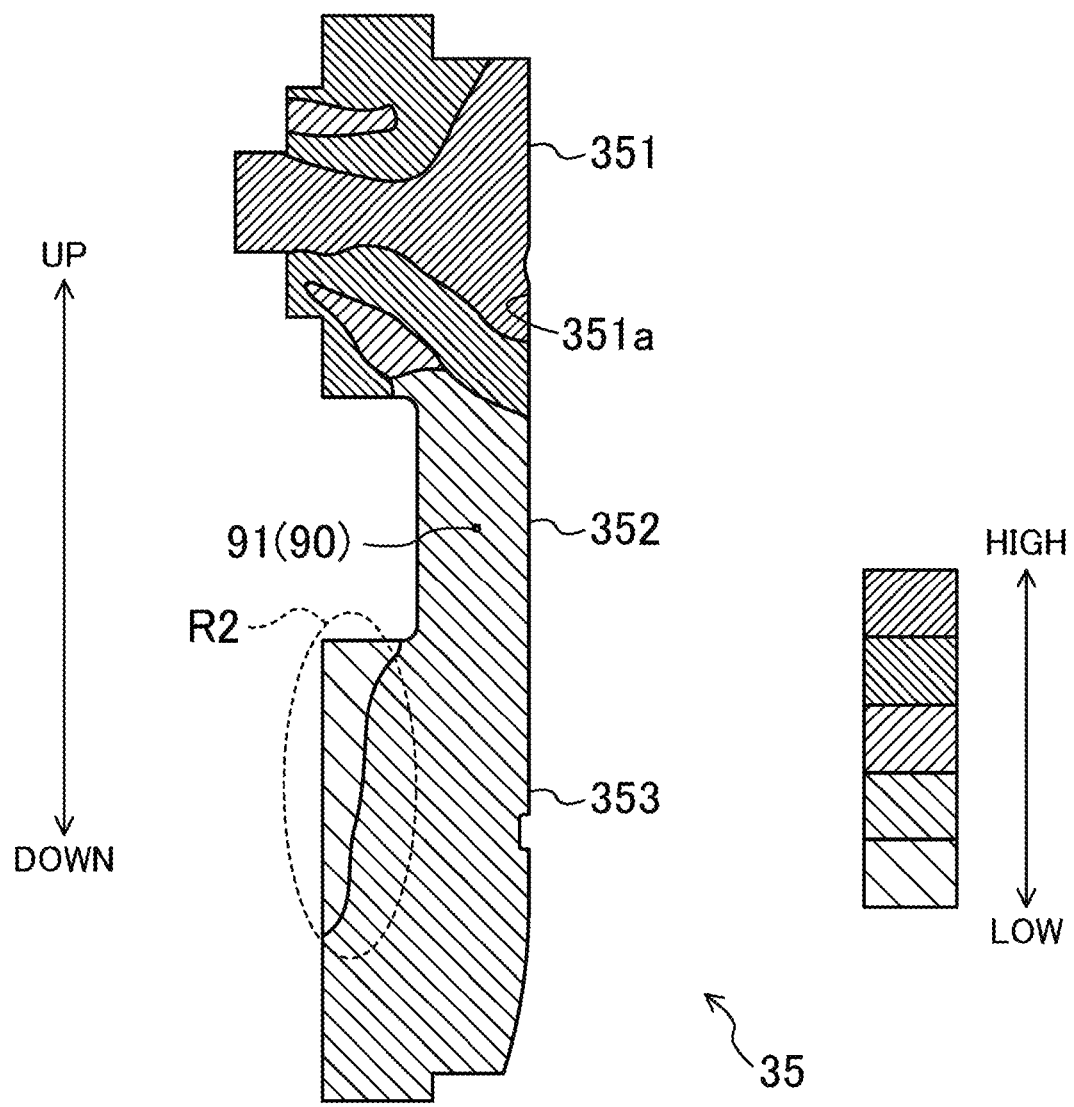
FIG. 17B is a contour diagram illustrating gas temperature distribution in the second passage in the cross-section taken along line D-D.

FIG. 16A is a schematic view of the second passage as viewed from the right. FIG. 16B is a contour diagram illustrating gas temperature distribution in the second passage in the cross-section taken along line C-C. FIG. 17A is a schematic view of the second passage as viewed from the front. FIG. 17B is a contour diagram illustrating gas temperature distribution in the second passage in the cross-section taken along line D-D.

As shown in FIGS. 16B and 17B, pulsation in the discharge pressure and/or jet of the gas discharged from the supercharger 34 may cause non-uniform temperature distribution of the gas immediately after being discharged from the supercharger 34. Specifically, relatively high-temperature gas flow and lower temperature gas flow may coexist around the upstream end 35a of the second passage 35 (around the supercharger-side part 351 in this embodiment). Such a state is disadvantageous in stably detecting the gas temperature.

However, according to the configuration described above, the second passage 35 has a smaller cross-sectional area in the position (i.e., the connecting part 352) including the narrow region 35c than in the part (i.e., the supercharger-side part 351) located upstream of the position, as shown in FIG. 17A. With this configuration, the high-temperature gas flow and the lower temperature gas flow gather when passing through the narrow region 35c.

As shown in FIG. 17A, the narrow region 35c curves gently to be recessed inward in the right/left direction. The right and left lower ends of the supercharger-side part 351 are gently connected to the right and left upper ends of the connecting part 352, which is advantage in collecting the gas flow.

This reduces non-uniform temperature distribution in the narrow region 35c as compared to the region around the upstream end 35a of the second passage 35, as shown in FIGS. 16B and 17B. Placement of the intake air temperature sensor 90 in such the narrow region 35c stabilizes the detection result.

It is also conceivable to place the intake air temperature sensor 90 in the cooler-side part 353, which is located downstream of the narrow region 35c, in place of the narrow region 35c. However, the cooler-side part 353 has a larger cross-sectional area than the connecting part 352. This configuration may cause, for example, turbulence at the corner with a larger cross-sectional area, when the gas flows from the connecting part 352 to the cooler-side part 353. This may lead to non-uniform distribution of the gas temperature as indicated by the circled regions R1 of FIG. 16B and R2 of FIG. 17B. Such non-uniform distribution is undesirable in stabilizing the detection result of the gas temperature. As described above, the configuration detecting the gas temperature in the narrow region 35c stabilizes the detection result.

In addition, the configuration described above is obtained by changing the shape of the second passage 35 and mounting the intake air temperature sensor 90 in a suitable position, without adding any screw, fin, or other component. The configuration described above is thus more advantageous in obtaining fuel efficiency than in the configuration including a screw, for example, in a middle of the second passage 35. The configuration described above maintains the simple entire shape of the second passage 35, and eventually reduces an increase in the intake resistance as compared to the configuration including, for example, a fin in the second passage 35.

As can be seen from FIG. 16A, the configuration described above allows the gas, which flowed from the supercharger 34 into the second passage 35, to flow forward from the upstream end 35a of the second passage 35, and then to collide with a front inner wall surface 351a of the second passage 35 so as to be oriented downward. The oriented gas flows along the collided inner wall surface 351a in accordance with a so-called wall-guide effect. This collects the high-temperature gas flow and the low-temperature gas flow forward, which reduces non-uniform temperature distribution as shown in FIG. 17B.

In addition, the gas flow along the front inner wall surface 351a may cause turbulence around the wall surface. This turbulence stirs the gas flowing around the wall surface, which is advantageous in reducing non-uniform temperature distribution.

In this manner, the influence of the collision with the wall surface, as well as the influence of the narrow region 35c described above make the configuration more advantageous in reducing variations in the gas temperature. This leads to stabilization of the detection result of the intake air temperature sensor 90.

According to the configuration described above, the thin formation of the second passage 35 as shown, for example, in FIG. 16A, reduces the depth of the second passage 35 and eventually the depth of the entire engine 1.

In addition, the narrow region 35c is formed by reducing not the depth, but the width of the second passage 35, which is relatively longer than the depth. This reduces an increase in the intake resistance as compared to the configuration with a smaller depth.

When the intake air temperature sensor 90 is mounted in the intake path 30, the detector 91 at the distal end of the intake air temperature sensor 90 is typically inserted inside a passage, while the fixed portion 92 at the base end is typically exposed to the outside of the passage. In this case, the fixed portion 92 is fixed to the duct defining the intake path 30 by means of, for example, engagement.

As shown, for example, in FIG. 17A, the configuration described above allows the placement of the fixed portion 92 of the intake air temperature sensor 90 utilizing the recesses in the outer surface of the second passage 35. Then, the intake air temperature sensor 90 can be mounted in a smaller area, without increasing the whole size of the engine 1.

As already described, the outlet 34c of the supercharger 34 may be offset from the upstream end 35a of the second passage 35 due to, for example, the design specifications of the supercharger 34. In this case, the temperature distribution of the gas flowing through the outlet 34c into the second passage 35 is also biased in the direction, in which the outlet 34c is offset.

In the configuration described above, the detector 91 of the intake air temperature sensor 90 is also offset in the direction, in which the outlet 34c is offset, as shown, for example, in FIG. 17A. This enables more precise detection of the gas temperature.

Second Embodiment

In the first embodiment, an example has been described where the fixed portion 92 of the intake air temperature sensor 90 is placed utilizing the recesses in the outer surface of the second passage 35. The configuration is not limited thereto. The gas temperature may be detected in the second passage 35 in the position including the narrow region 35c.

Figure 18:
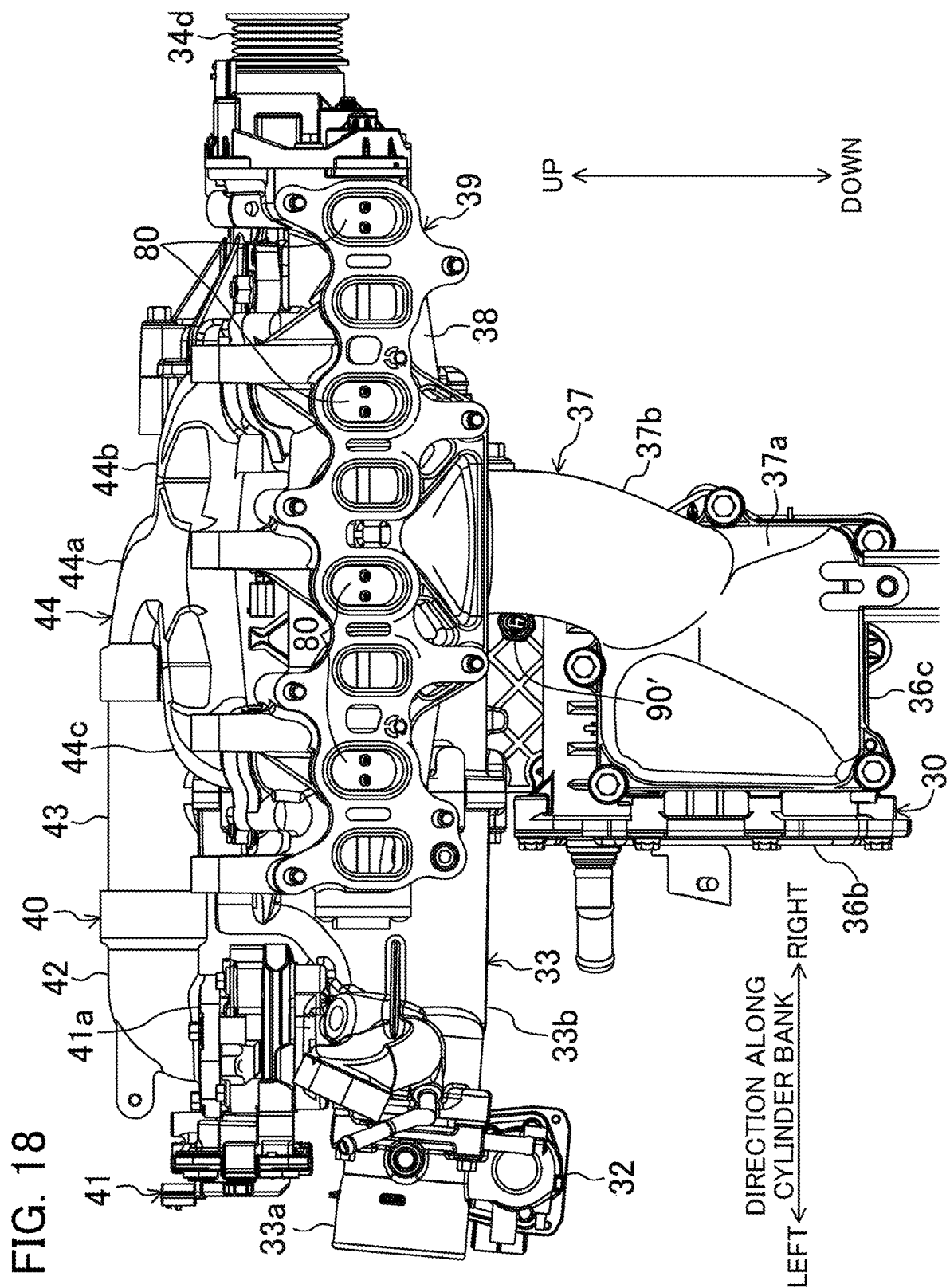
FIG. 18 corresponds to FIG. 5, and illustrates a mount structure according to a second embodiment.
Figure 19:
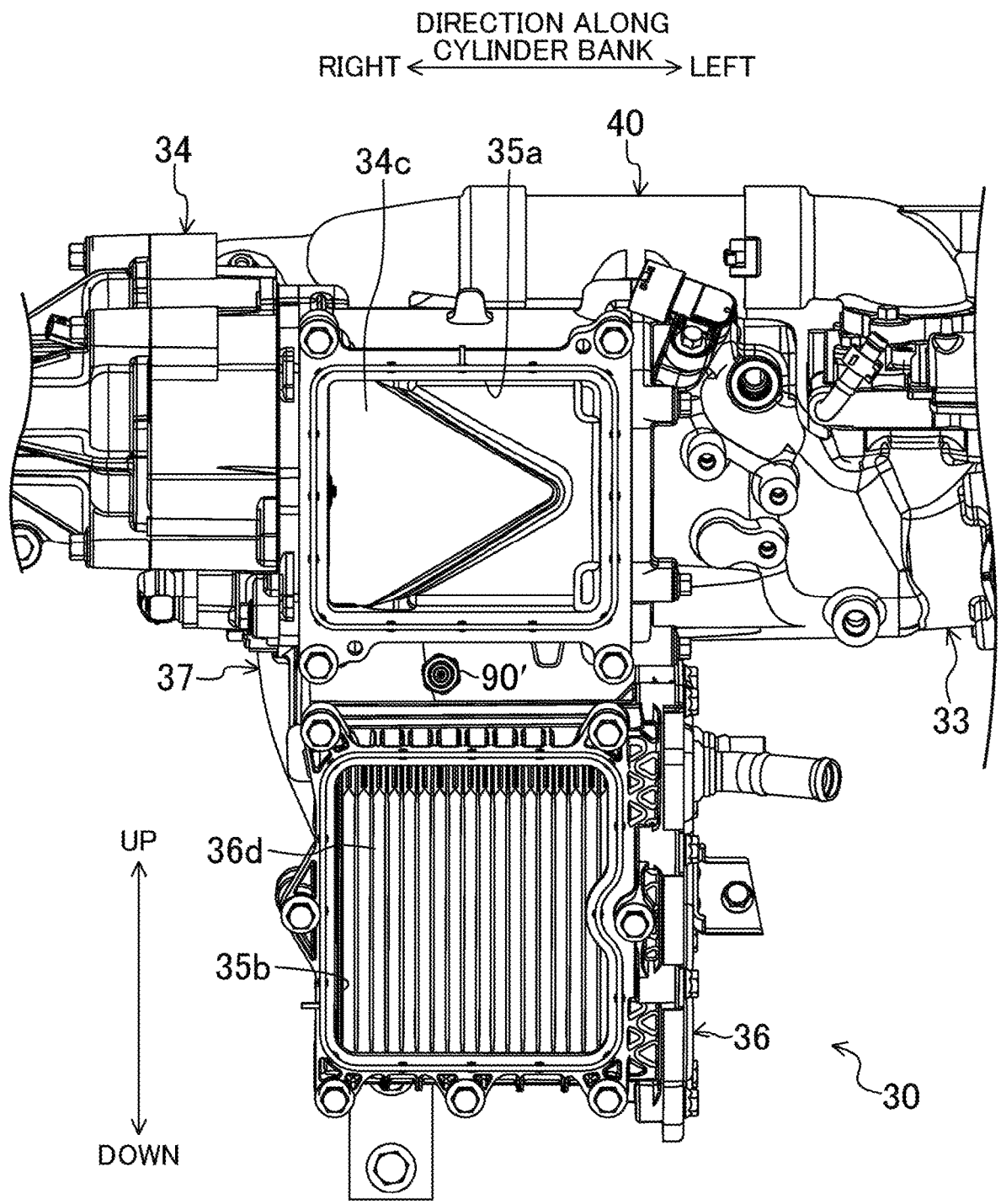
FIG. 19 corresponds to FIG. 12, and illustrates the mount structure according to the second embodiment.
Figure 20:
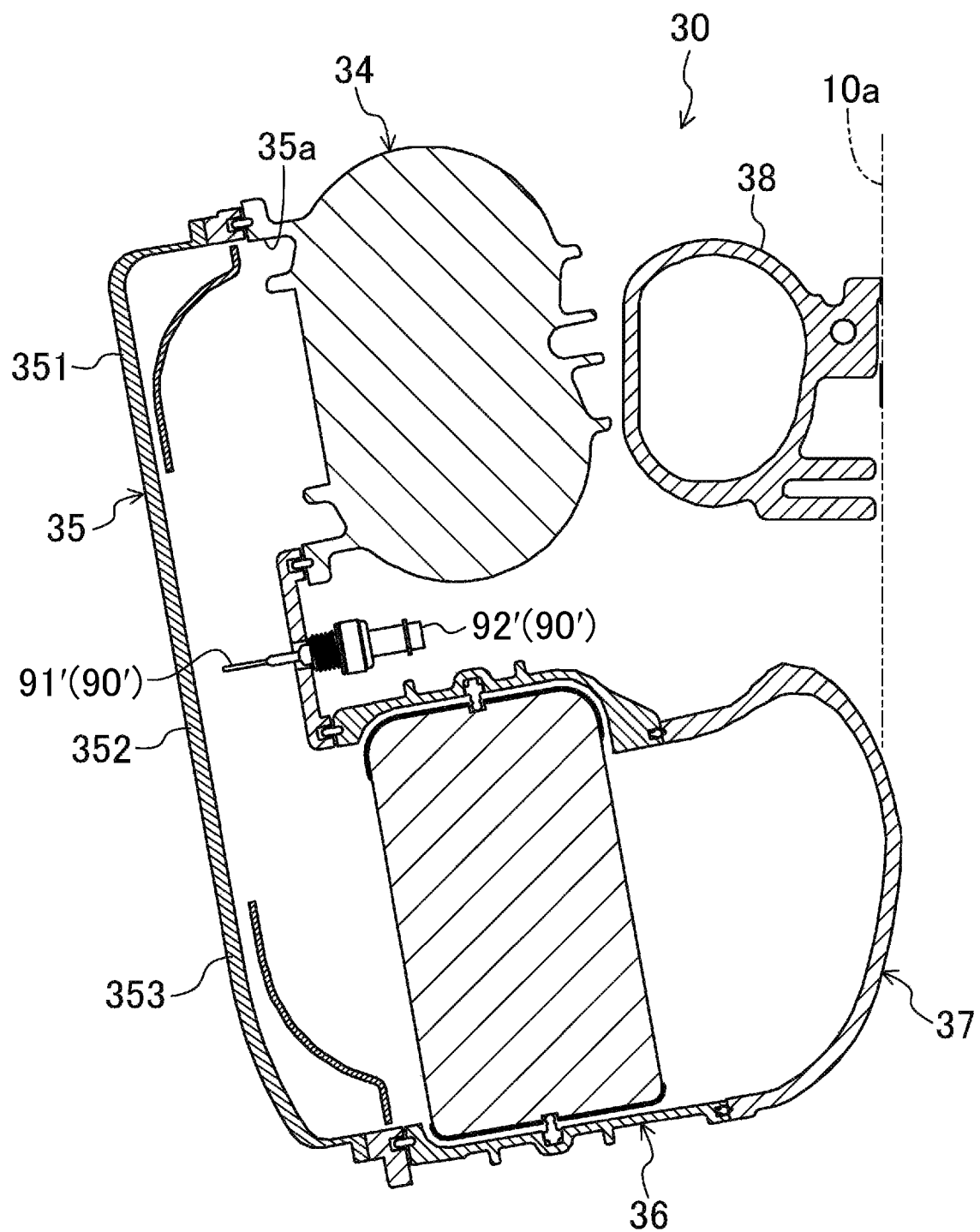
FIG. 20 corresponds to FIG. 14, and illustrates the mount structure according to the second embodiment.

Now, a second embodiment of a structure of mounting an intake air temperature sensor will be described with reference to FIGS. 18 to 20. FIG. 18 corresponds to FIG. 5 and illustrates a mount structure according to a second embodiment. FIG. 19 corresponds to FIG. 12 and illustrates the mount structure. FIG. 20 corresponds to FIG. 14 and illustrates the mount structure.

Other than the details of the mount structure, the intake air temperature sensor 90' according to the second embodiment has a configuration similar to that of the intake air temperature sensor 90 according to the embodiment described above. Specifically, this intake air temperature sensor 90' is a thermocouple temperature sensor including a detector 91' and a fixed portion 92'. The detector 91' is located at the distal end of the intake air temperature sensor 90' and inserted inside the second passage 35. The fixed portion 92' is located at the base end opposite to the detector 91' and exposed to the outside of the second passage 35.

The fixed portion 92' according to the second embodiment is formed not inside the recesses of the narrow region 35c but in the gap between the supercharger 34 and the intercooler 36.

Specifically, this fixed portion 92' is fixed to the rear surface (more specifically, the rear surface of the connecting part 352 in the first embodiment) of the second passage 35 as shown in FIGS. 18 to 20. The detector 91' projects forward from the rear surface. Although not shown in detail, this detector 91' detects the gas temperature in the second passage 35 in the position including the narrow region 35c as in the first embodiment.

This configuration utilizes the gap between the supercharger 34 and the intercooler 36 in placement of the fixed portion 92' of the intake air temperature sensor 90'. Then, the intake air temperature sensor 90' can be mounted in a smaller area, without increasing the whole size of the engine 1.

Other Embodiments

In the first embodiment, the narrow region 35c reduces the cross-sectional area of the connecting part 352 relative to the supercharger-side part 351 and the cooler-side part 353. The configuration is not limited thereto. The narrow region 35c may reduce the cross-sectional area of the connecting part 352 relative to at least the supercharger-side part 351.

For example, the width W1 of the supercharger-side part 351 may be larger than the width W2 of the connecting part 352, and the width W2 of the connecting part 352 may be equal to the width W3 of the cooler-side part 353 (W1>W2=W3).

In addition, the supercharger 34 is a so-called "supercharger" in the example of the first embodiment, but is not limited thereto. The supercharger 34 may be a turbocharger.

The invention claimed is:

1. A structure of mounting an intake air temperature sensor of an engine with a supercharger, the structure comprising:
    an engine body including cylinders; and
    an intake path including, between its upstream and downstream ends, the supercharger and an intercooler in this order from the upstream end, and communicating with the cylinders at the downstream end, wherein
    the intake path includes an intermediate passage connecting a gas outlet of the supercharger and a gas inlet of the intercooler together,
    the intermediate passage includes, in its middle position, a narrow region with a smaller cross-sectional area than a part of the intermediate passage extending from an upstream end of the intermediate passage to the middle position,
    the narrow region is provided with the intake air temperature sensor configured to detect a gas temperature in the narrow region,
    the gas outlet and the gas inlet are open in a same direction,
    the intermediate passage extends from its upstream end connected to the gas outlet, in the direction in which the gas outlet and the gas inlet are open, and is then bent toward the gas inlet, and
    the narrow region is located downstream of a position in which the intermediate passage is bent toward the gas inlet.

2. The structure of claim 1, wherein
    the intermediate passage is a thin passage with a smaller depth in the direction in which the gas outlet and the gas inlet are open, than a width orthogonal to a direction extending from the gas outlet to the gas inlet, and
    the narrow region has a smaller width than a part of the intermediate passage extending from the upstream end of the intermediate passage to the narrow region, and a part of the intermediate passage extending from the narrow region to a downstream end of the intermediate passage.

3. The structure of claim 1, wherein
    the narrow region forms a recess in an outer surface of the intermediate passage,
    the intake air temperature sensor includes:
        a detector located at its distal end, and inserted inside the intermediate passage, and a fixed portion located at its base end opposite to the detector, and exposed to an outside of the intermediate passage, and the fixed portion is fixed inside the recess.

4. The structure of claim 1, wherein the supercharger and the intercooler are adjacent to each other at a predetermined distance, the intake air temperature sensor includes:

a detector located at its distal end, and inserted inside the intermediate passage, and a fixed portion located at its base end opposite to the detector, and exposed to an outside of the intermediate passage, and the fixed portion is located in a gap between the supercharger and the intercooler.

5. The structure of claim 1, wherein the cylinders are arranged in a line, a central portion of the gas outlet is offset from a central portion of the upstream end of the intermediate passage to one side of a cylinder bank, as the gas outlet is viewed from front in a direction orthogonal to the cylinder bank, and the intake air temperature sensor is offset from a central portion of the narrow region in a direction along the cylinder bank to the one side of the cylinder bank.

6. The structure of claim 2, wherein the narrow region forms a recess in an outer surface of the intermediate passage, the intake air temperature sensor includes:

a detector located at its distal end, and inserted inside the intermediate passage, and a fixed portion located at its base end opposite to the detector, and exposed to an outside of the intermediate passage, and the fixed portion is fixed inside the recess.

7. The structure of claim 2, wherein the supercharger and the intercooler are adjacent to each other at a predetermined distance, the intake air temperature sensor includes:

a detector located at its distal end, and inserted inside the intermediate passage, and a fixed portion located at its base end opposite to the detector, and exposed to an outside of the intermediate passage, and the fixed portion is located in a gap between the supercharger and the intercooler.

8. The structure of claim 2, wherein the cylinders are arranged in a line, a central portion of the gas outlet is offset from a central portion of the upstream end of the intermediate passage to one side of a cylinder bank, as the gas outlet is viewed from front in a direction orthogonal to the cylinder bank, and the intake air temperature sensor is offset from a central portion of the narrow region in a direction along the cylinder bank to the one side of the cylinder bank.

9. The structure of claim 3, wherein the cylinders are arranged in a line, a central portion of the gas outlet is offset from a central portion of the upstream end of the intermediate passage to one side of a cylinder bank, as the gas outlet is viewed from front in a direction orthogonal to the cylinder bank, and the intake air temperature sensor is offset from a central portion of the narrow region in a direction along the cylinder bank to the one side of the cylinder bank.

10. The structure of claim 4, wherein the cylinders are arranged in a line, a central portion of the gas outlet is offset from a central portion of the upstream end of the intermediate passage to one side of a cylinder bank, as the gas outlet is viewed from front in a direction orthogonal to the cylinder bank, and the intake air temperature sensor is offset from a central portion of the narrow region in a direction along the cylinder bank to the one side of the cylinder bank.

* * * * *